(12) United States Patent
Kandregula

(10) Patent No.: US 9,715,554 B2
(45) Date of Patent: *Jul. 25, 2017

(54) METHODS AND APPARATUS TO IDENTIFY USAGE OF QUICK RESPONSE CODES

(71) Applicant: The Nielsen Company (US), LLC, New York, NY (US)

(72) Inventor: Anil Kandregula, Richardson, TX (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,831

(22) Filed: Oct. 30, 2015

(65) Prior Publication Data

US 2016/0048604 A1    Feb. 18, 2016

Related U.S. Application Data

(63) Continuation of application No. 13/658,604, filed on Oct. 23, 2012, now Pat. No. 9,218,610.

(51) Int. Cl.
*G06K 19/00*    (2006.01)
*G06F 17/30*    (2006.01)
(Continued)

(52) U.S. Cl.
CPC .. *G06F 17/30887* (2013.01); *G06F 17/30879* (2013.01); *G06K 7/1447* (2013.01);
(Continued)

(58) Field of Classification Search
CPC ........ G06F 17/30887; G06F 17/30879; G06Q 30/0241; G06Q 30/0277; G06K 19/06037; G06K 19/06103; G06K 7/1447
(Continued)

(56) References Cited

U.S. PATENT DOCUMENTS 8,010,408 B2 *   8/2011   Rubinstein ............. G06Q 30/02
                                                    235/462.01
8,261,972 B2     9/2012   Ziegler
(Continued)

FOREIGN PATENT DOCUMENTS

JP    2007122677    5/2007
JP    2012150746    8/2012
(Continued)

OTHER PUBLICATIONS

Patent Cooperation Treaty, "International Preliminary Report on Patentability," issued in connection with Application No. PCT/US2013/061982, Apr. 28, 2015, 13 pages.

(Continued)

*Primary Examiner* — Paultep Savusdiphol
(74) *Attorney, Agent, or Firm* — Hanley, Flight & Zimmerman, LLC

(57) ABSTRACT

Methods and apparatus are disclosed to identify usage of quick response codes. An example method includes inspecting a received request to identify a QR code associated with the request, the request being received from a device in response to an instruction included in the QR code. The example method further includes storing a record indicating access to the identified QR code. The example method further includes determining a redirect universal resource locator (URL) associated with the identified QR code. The example method further includes transmitting a redirect message to the device, the redirect message to instruct the device to navigate to the redirect URL.

28 Claims, 11 Drawing Sheets

(51) Int. Cl.
*G06Q 30/02* (2012.01)
*G06K 7/14* (2006.01)
*G06K 19/06* (2006.01)

(52) U.S. Cl.
CPC . *G06K 19/06037* (2013.01); *G06K 19/06103* (2013.01); *G06Q 30/0241* (2013.01); *G06Q 30/0277* (2013.01)

(58) Field of Classification Search
USPC .................................. 235/487, 494, 462.13
See application file for complete search history.

(56) References Cited

U.S. PATENT DOCUMENTS

| | | | |
|---|---|---|---|
| 8,464,960 B2* | 6/2013 | Ibrahimbegovic | H04L 63/0823 235/494 |
| 8,708,221 B1* | 4/2014 | Sprague | G06Q 10/08 235/375 |
| 9,038,887 B1 | 5/2015 | O'Hanlon | |
| 2007/0233554 A1 | 10/2007 | Sakai et al. | |
| 2009/0234731 A1* | 9/2009 | Mariotti | G06Q 20/20 705/14.1 |
| 2011/0087539 A1* | 4/2011 | Rubinstein | G06Q 30/02 705/14.41 |
| 2012/0036006 A1* | 2/2012 | Mauro | G06Q 30/0243 705/14.42 |
| 2012/0084154 A1* | 4/2012 | Dresner | G06Q 20/10 705/14.66 |
| 2012/0158954 A1* | 6/2012 | Heffernan | H04L 43/04 709/224 |
| 2012/0234907 A1* | 9/2012 | Clark | G06F 17/30879 235/375 |
| 2012/0280031 A1 | 11/2012 | Nelson et al. | |
| 2013/0001291 A1* | 1/2013 | Ibrahimbegovic | H04L 63/0823 235/375 |
| 2013/0024253 A1* | 1/2013 | Silverman | G09F 23/12 705/14.4 |
| 2013/0054271 A1 | 2/2013 | Langford et al. | |
| 2013/0061243 A1* | 3/2013 | Pillers | G06F 9/542 719/313 |
| 2013/0111013 A1* | 5/2013 | Besehanic | H04H 60/66 709/224 |
| 2013/0179276 A1* | 7/2013 | Wheelon | B42D 15/045 705/14.73 |
| 2013/0193200 A1* | 8/2013 | O'Connor | G06Q 30/0281 235/375 |
| 2014/0006138 A1* | 1/2014 | Black | G06Q 30/0251 705/14.41 |
| 2014/0110468 A1 | 4/2014 | Kandregula | |
| 2014/0155022 A1 | 6/2014 | Kandregula | |

FOREIGN PATENT DOCUMENTS

| | | |
|---|---|---|
| KR | 1020120100388 | 9/2012 |
| WO | 2014065983 | 5/2014 |

OTHER PUBLICATIONS

International Searching Authority, "International Search Report and Written Opinion" issued in connection with corresponding PCT Application No. PCT/US2013/061982, on Jan. 16, 2014 (15 pages).

"14 Million Americans Scanned QR Codes on their Mobile Phones in Jun. 2011", comScore, Insights/Press Releases, Aug. 12, 2011, retrieved from web browser on Jan. 23, 2013, <http://www.comscore.com/Insights/Press_Releases/2011/8/14_Million_Americans_Scanned_QR_or_Bar_Codes_on_their_Mobile_Phones_in_June_2011> (3 pages).

Spiro Pappadopoulos, "Easy Way to Track QR Code Performance," Spirocks.com, retrieved on Aug. 26, 2013 from <http://spirocks.com/easy-way-to-track-qr-code-performance/> (6 pages).

United States Patent and Trademark Office, "Non-Final Office Action," issued in connection with U.S. Appl. No. 13/658,604, Feb. 28, 2014, 21 pages.

United States Patent and Trademark Office, "Non-Final Office Action," issued in connection with U.S. Appl. No. 13/658,604, Sep. 10, 2014, 21 pages.

United States Patent and Trademark Office, "Final Office Action," issued in connection with U.S. Appl. No. 13/658,604, Mar. 23, 2015, 19 pages.

United States Patent and Trademark Office, "Notice of Allowance," issued in connection with U.S. Appl. No. 13/658,604, Aug. 14, 2015, 23 pages.

* cited by examiner

| ADVERTISEMENT IDENTIFIER/NAME | PRESENTATION TYPE | PRESENTATION ID | QR URL | QR CODE | REDIRECT URL |
|---|---|---|---|---|---|
| ADVERTISEMENT 1 | BILLBOARD AT STATE STREET AND LAKE STREET, CHICAGO, IL | 10001 | HTTP://WWW.COLLECTIONSITE.COM/?Q=10001 |  | HTTP://WWW.ADVERTISER1.COM |
| ADVERTISEMENT 1 | WIRED MAGAZINE, PG. 10 | 10002 | HTTP://WWW.COLLECTIONSITE.COM/?Q=10002 |  | HTTP://WWW.ADVERTISER1.COM |
| ADVERTISEMENT 1 | POSTER AT ADAMS AND WABASH ELEVATED (EL) TRAIN STATION IN CHICAGO, IL | 10003 | HTTP://WWW.COLLECTIONSITE.COM/?Q=10003 |  | HTTP://WWW.ADVERTISER1.COM |
| ADVERTISEMENT 2 | POSTCARD SENT IN MAILER ON OCTOBER 16, 2012 | 20004 | HTTP://WWW.COLLECTIONSITE.COM/?Q=20004 |  | HTTP://WWW.ADVERTISER2.COM |
| ADVERTISEMENT 3 | BOARDGAMEGEEK.COM WEBSITE | 30005 | HTTP://WWW.ADVERTISER3.COM/?Q=30005 |  | N/A |
| ADVERTISEMENT 3 | BUSINESS CARD OF JOHN DOE | 30006 | HTTP://WWW.ADVERTISER3.COM/?Q=30006 |  | N/A |
| ADVERTISEMENT 3 | CHICAGO TRIBUNE NEWSPAPER, DATED OCTOBER 15, 2012, PAGE 3 OF ARTS SECTION | 30007 | HTTP://WWW.ADVERTISER3.COM/?Q=30007 |  | N/A |

FIG. 4

| | PANELIST OR CENSUS | IP ADDRESS | TIMESTAMP | PANELIST ID | PRESENTATION ID | PANELIST INFORMATION |
|---|---|---|---|---|---|---|
| 550 → | PANELIST | 138.108.20.122 | 9/1/2012 8:00AM | A | 10003 | GPS COORDINATES: 41.87989,-87.637158 |
| 555 → | PANELIST | 157.166.255.18 | 9/1/2012 9:50AM | B | 20004 | GPS COORDINATES: N/A |
| 560 → | PANELIST | 74.125.225.142 | 9/1/2012 5:34PM | C | 10001 | GPS COORDINATES: 40.758913,-73.9851 |
| 565 → | CENSUS | 64.208.186.106 | 9/2/2012 7:02AM | N/A | 10002 | N/A |
| 570 → | PANELIST | 50.31.151.33 | 9/2/2012 7:02AM | D | 10002 | GPS COORDINATES: 42.031022,-88.033502 |
| 575 → | CENSUS | 107.6.106.82 | 9/3/2012 3:30PM | N/A | 30006 | N/A |
| 580 → | CENSUS | 207.200.74.38 | 9/3/2012 3:38PM | N/A | 20004 | N/A |
| 585 → | PANELIST | 207.200.74.38 | 9/3/2012 3:38PM | D | 20004 | GPS COORDINATES: 42.031022,-88.033502 |

FIG. 5

METHODS AND APPARATUS TO IDENTIFY USAGE OF QUICK RESPONSE CODES

RELATED APPLICATION

This patent arises from a continuation of U.S. patent application Ser. No. 13/658,604, filed Oct. 23, 2012, entitled "Methods and Apparatus to Identify Usage of Quick Response Codes", now U.S. patent Ser. No. 9,218,610, which is hereby incorporated herein by reference in its entirety.

FIELD OF THE DISCLOSURE

This disclosure relates generally to quick response (QR) codes, and, more particularly, to methods and apparatus to identify usage of quick response codes.

BACKGROUND

Quick Response (QR) codes are two dimensional black and white barcodes that encode information such as text and/or numbers. When a user scans a QR code with, for example, their mobile device, they may be presented with additional information such as a Universal Resource Locator of a website, a phone number, a name, etc. QR codes are increasingly being used for multiple purposes including, for example, advertising.

BRIEF DESCRIPTION OF THE DRAWINGS

FIG. 4 is an example data table that may be stored by the example monitoring data collection site of FIG. 1.

FIG. 5 is an example data table representing QR code exposure impressions that may be stored by the example monitoring data collection site of FIG. 1.

DETAILED DESCRIPTION

Figure 1:
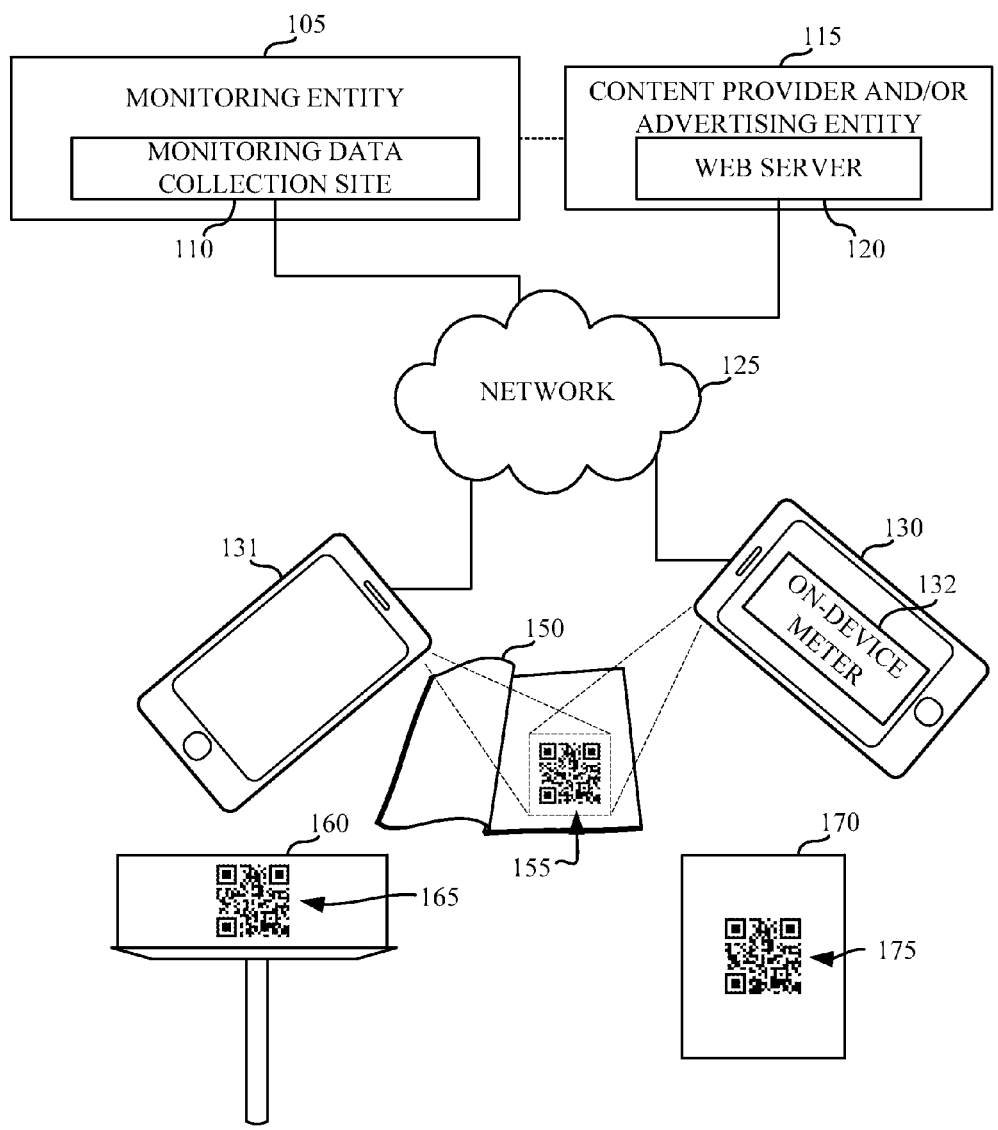
FIG. 1 is a diagram of an example system constructed in accordance with the teachings of this disclosure to identify usage of quick response (QR) codes.

Quick Response (QR) codes are two-dimensional black and white barcodes that encode information such as text and/or numbers. When a user scans a QR code with, for example, their mobile device, they may be presented with additional information such as a Universal Resource Locator of a website, a phone number, a name, etc. While the examples described herein are described in the context of a QR code, any other past, present, and/or future barcode and/or barcode format may additionally or alternatively be used. For example, any one-dimensional barcode (e.g., a Code 39 barcode, a Code 128 barcode, a Universal Product Code (UPC) barcode, etc.), any two-dimensional barcode (e.g., an Aztec Code barcode, a Codablock barcode, a High Capacity Color Barcode (HCCB), a QR code, etc.), and/or any other past, present, and/or future barcode may additionally or alternatively be used.

Users typically use QR codes to gain additional information from the world around them. For example some carriers (e.g. posters, billboards, business cards, etc.) may only contain a limited amount of information due to size and/or design constraints. To enable the user to gather additional information about whatever they are looking at, QR codes are implemented which allow the user to scan the QR code using a QR code scanner (e.g. a mobile device) and retrieve additional information from, for example, a website.

In some examples, QR codes are used in advertising. Using QR code in advertising enables a user to gather additional information about the product(s) and/or advertisement(s) that they are looking at. For example, a QR code may comprise a link to a website where a user can navigate to purchase the product associated with the QR code. In some other examples, QR codes may be used to enable the user to find additional information about a product. For example, a QR code may be used on a food product to enable a user to lookup nutritional information related to that food product. In some examples, the information provided by the QR code is a link to a website. However, the information presented by the QR code may be any other information such as for example, a link to download a smartphone application, contact information, geolocation information, a telephone number, etc. For example, to share contact information (e.g., in lieu of a business card) a first user might display a QR code on their smart phone while a second user uses a QR scanning application on a second smartphone to recognize the contact information encoded by the QR code displayed by the first smartphone.

Because QR codes are easy to implement, QR codes are displayed using multiple sources such as, for example, newspapers, flyers, posters, product packaging, television advertisements, billboards, etc. Because QR codes can be displayed on carriers that are movable (e.g. newspapers, magazines, business cards, etc.), they can be viewed at almost any location. For example, a QR code may be viewed on a billboard in a downtown area, at a storefront, on product packaging in a store, on a display in a community center, on a magazine in a user's home, etc. Further, QR codes may encode different types of information. For example a QR code on product packaging might encode a link to additional information about a product, while a QR code displayed at the front of a restaurant might encode a link to a menu for the restaurant. In some examples, the QR code does not encode a link to a website. For example, a QR code might encode contact information e.g. a telephone number, and address, etc.

Companies want to know that their expenses are effectively being allocated to different forms of advertising (e.g., billboards, newspapers, magazines, etc.). Because users are increasingly using QR codes to access additional information associated with advertisements, companies that use QR codes seek to understand how users receive and/or interact with QR code. For example, such companies wish to understand the reach and effectiveness of the QR codes and the advertisements and/or products associated with such QR codes. By monitoring the use of such QR codes, not only can the company understand the usage of QR codes, but the company may also understand trends related to how users interact with those QR codes. For example, a company using QR codes to provide additional information on an advertisement will typically invest a large amount of capital into preparing and distributing such advertisement. Such a company may be interested to know, for example, whether a poster carrying a QR code in a mall location is more effective than a billboard carrying a QR code in a downtown location, whether a television advertisement carrying a QR code is more effective than a newspaper advertisement carrying a QR code, etc. Such information enables companies to effectively plan marketing campaigns.

Users typically use smartphones with QR reader and/or scanner applications to read and/or scan QR codes. The QR reader application uses a camera of the smartphone to take an image of the QR code, decode the QR code, and perform an action based on the decoded QR code. For example, the action might be displaying a website retrieved from an address (e.g., a universal resource locator (URL)) encoded by the QR code in a browser of the smartphone. There are many different QR reading applications available for smart phones via for example, the Apple iTunes store, the Google play App Store, etc.

Companies monitoring the reach and effectiveness of QR codes and advertisements associated with those QR codes are presently limited to inspecting web server logs to identify when information encoded by a QR code is requested. Because many different types and/or formats of advertisements may link to the same information (e.g., both a QR code in a magazine and a QR code in a newspaper may encode a link to the same website, etc.), inspecting web server logs does not enable identification of the source of the QR code. Further, inspecting web server logs does not enable user identification. While web server logs may identify an Internet Protocol (IP) address of a device that requested the information, IP addresses are prone to change (e.g., many IP addresses are dynamically assigned and may be re-assigned after a short period of time) and/or requests may come through proxy servers that mask the identity of the ultimate requesting device. Thus, server logs typically do not uniquely identify the device and/or the user making the request. Identifying users that utilize QR codes enables correlation of demographic information with the use of such QR codes. Additionally, inspecting web server logs does not enable identification of the location of the QR code (e.g., on page three of the New York Times, on a billboard at the intersection of State Street and Madison Street in Chicago, Ill., etc.) at the time the QR code was scanned. For example, based on data in web server logs, it is not possible to tell if a QR code was scanned from a billboard in a downtown location or if a QR code was scanned from a magazine at a home location.

Companies such as The Nielsen Company utilize on-device meters to monitor usage of cellphones, tablets, and/or other computing devices. An on-device meter is software that collects data of interest concerning usage of the monitored device. Because many different QR scanning applications exist for many different smart phone devices, interfacing with these applications via an on-device meter is difficult. For example, some QR scanning applications delete images captured by the camera after they are recognized to save storage space. Furthermore, images captured by a camera are not always stored in the same location. In some examples, restrictions imposed by the operating systems of the smart phone prevents access to local storage associated with other applications (e.g., QR scanning applications). Accordingly, identifying images captured by a camera is difficult. In some examples, the smart phone only allows a single application to interact with the device hardware (e.g., a camera) at a time. Because applications not controlling the hardware cannot interface with that hardware in such circumstances, an on-device meter monitoring a QR scanning application cannot detect when a QR code is scanned. In some examples, usage of QR codes may be monitored by collaborating with existing QR scanning applications and their respective developers. In such examples, the QR scanning application may be structured to transmit a notification (e.g., a log, a request, etc.) when a QR code is scanned. However, collaborating with developers of QR scanning applications is difficult because there are many different developers of QR scanning applications.

Example systems, methods, and/or apparatus described herein enable monitoring the reach and effectiveness of QR codes associated with different media (e.g. posters, billboards, magazines, etc.), enable reporting of demographics associated with the use of QR codes, enable identification of different sources of QR codes, and/or enable monitoring of trends associated with the use of QR code.

In the examples described herein, different QR codes are used in association with different carrier-advertisement pairs to facilitate identification of the advertisements and/or carriers (e.g., display formats) of those advertisements. For example, an advertisement included in a newspaper may contain a first QR code, while a same and/or similar advertisement included in a magazine may contain a second QR code different from the first QR code. Both the first and the second QR codes, when scanned, result in display of the same and/or similar information. However, because they are different, they can be uniquely identified.

When different QR codes are used for the same and/or similar advertisements, different properties of the advertisement may be encoded into and/or identified by the QR code. For example, a QR code may identify a vendor (e.g., the New York Times, Wired Magazine, etc.), a source type (e.g., a magazine, a poster, a flyer, etc.), a location, a product, and/or combinations of the same.

Panelist based and/or non-panelist based (e.g., census based) systems are disclosed herein to enable identification of the usage of QR codes. Panelist based systems disclosed herein enlist users (i.e., panelists) who have agreed to participate in a study. In panelist systems demographic information is obtained from the user when, for example, the user joins and/or registers for the panel. The demographic information may be obtained from the user, for example, via a telephone interview, by having the user complete a survey (e.g., an online survey), etc. In some examples, the panelist is instructed to install an on-device meter onto their mobile device (e.g., a cellular phone, a personal digital assistant, etc.) In examples disclosed herein, the on-device meter monitors usage of QR codes by the mobile device and reports such usage to a monitoring entity. Using a panelist based system enables identification of demographic information in association with the use of QR codes, enables identification of a location where the QR code was scanned (e.g., via global positioning system (GPS) information collected from the monitored device), and/or enables identification of QR codes that do not reference a website (e.g., a QR code that encodes a telephone number, etc.).

Non-panelist systems are commonly referred to as census systems. Census based systems disclosed herein allow for collection of QR code usage information from non-panelist users. However, because the users are not panelists, demographic information is not collected and/or identified. Some census based systems collect exposure information at the server level. Collecting information at the server level enables an accurate measure of information served by the monitored server, but does not collect information related to servers that are not monitored. Furthermore, collecting information at the server level does not easily lend itself to distinguishing panelist users from non-panelists users. Accordingly, census systems may record information from panelist and non-panelist users alike.

Unlike panelist based systems in which audience measurement entities rely solely on their own panel member data to collect demographics-based audience measurement, example census based systems disclosed herein enable an audience measurement entity to share and/or retrieve demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc. Such cooperation with database proprietors effectively leverages the content tagging capabilities of the monitoring entity and the use of databases of non-ratings entities such as social media and other websites to create an enormous, demographically accurate panel that results in accurate, reliable measurements of exposures to Internet content such as advertising and/or programming. Methods for cooperating with database proprietors to obtain demographic information are disclosed in Mazumdar, U.S. patent application Ser. No. 13/513,148, which is hereby incorporated by reference.

Census based systems may be implemented in a number of different ways. In some examples disclosed herein, QR codes, when scanned, direct a smartphone or other device to request data from a third-party site (e.g. a site not hosted by the monitoring data collection site). In some examples, this third-party site provides information to the user devices associated with the QR code that was scanned. In some examples, the third-party site instructs the browser of the user device to transmit a request to the monitoring data collection site. In some examples, the instruction causes the browser to request an image (e.g. a one pixel by one pixel and/or a transparent image) from the monitoring data collection site. In response, the monitoring data collection site may develop a monitoring instruction to monitor further usage of the device as described in in Blumenau, U.S. Pat. No. 6,108,637, which is hereby incorporated by reference in its entirety.

In some other examples, QR codes, when scanned, direct the mobile device to the monitoring data collection site rather than to a third party system. The monitoring data collection site then records the access based on the QR code and redirects the mobile device to the third-party site. The third-party site then provides information to the mobile device associated with the QR code that was scanned. In some examples, redirecting the mobile device is implemented by transmitting a redirect message to the mobile device. In some other examples, the monitoring data collection site functions as a proxy server. When the monitoring data collection site functions as a proxy server, it requests the information from the third party site on behalf of the mobile device, and relays the information to the mobile device.

FIG. 1 is a diagram of an example system constructed in accordance with the teachings of this disclosure to identify usage of QR codes. The example system includes a monitoring data collection site 110 and an on device meter 132. The example system of FIG. 1 shows an example environment of use including a monitoring entity 105, a content provider and/or advertising entity 115, a Web server 120, a network 125, a mobile device 130, a magazine 150, a Billboard 160, and a poster 170. In the illustrated example, the monitoring data collection site 110 is hosted by the monitoring entity 105, and the web server 120 is hosted by a content provider and/or advertisement provider 115. In the illustrated example, the on-device meter 132 is executed by the mobile device 130 and is provided by the monitoring entity 105. In the illustrated examples, the mobile device 130 is operated by a user and may be referred to as "a user device." The example environment of use of FIG. 1 also includes a mobile device 131 that does not include an on-device meter.

The example monitoring entity 105 of the illustrated example of FIG. 1 is an entity that monitors and/or reports the usage of advertisements and/or other types of media such as The Nielsen Company (US), LLC. In the illustrated example, the monitoring entity 105 is a neutral third party that does not provide content and/or advertisements to end users. This un-involvement with the content/advertisement delivery ensures the neutral status of the monitoring entity 105 and, thus, enhances the trusted nature of the data it collects. In the illustrated example, the monitoring entity 105 operates and/or hosts the monitoring data collection site 110. The example monitoring data collection site 110 of the illustrated example is a server and/or database that collects and/or receives information related to the usage of QR codes. In the illustrated example, the monitoring data collection site 110 receives information via the network 125. However, the monitoring data collection site 110 may receive data in any additional and/or alternative fashion.

The example content provider and/or advertising entity 115 of the illustrated example of FIG. 1 can be a proprietor of a website (e.g., cnn.com, amazon.com, boardgamegeek.com, etc.) and/or an advertisement publisher. The content provider and/or advertising entity 115 may engage the monitoring entity 105 to collect and/or monitor information related to advertisements associated with the content provider and/or advertising entity 115. Such a content provider and/or advertising entity 115 may wish to use QR codes displayed in various forms of advertising (e.g., online, newspapers, magazines, billboards, posters, product packaging, etc.) The QR codes displayed on those advertisements enable end users to retrieve additional information about the advertisement and/or the products associated with those advertisements. Accordingly, the content provider and/or advertising entity 115 of the illustrated example operates and/or hosts a web server 120 that responds to requests for additional information associated with the QR codes. In some examples, the information returned in response to the request for additional information includes an instruction to inform the monitoring data collection site 110 of the usage of the QR code. In some examples, the web server is operated and/or hosted by a third party.

The example network 125 of the illustrated example of FIG. 1 is the Internet. However, any other network could additionally or alternatively be used. For example, some or all of the network 125 may be a company's intranet network, a personal (e.g., home) network, etc. Although the network 125 of the illustrated example operates based on the HTTP and IP protocols, the network 125 may additionally or alternatively use any other protocol to enable communication between devices on the network.

The example mobile device 130 of the illustrated example of FIG. 1 is a smartphone (e.g., an Apple® iPhone®, HTC Sensation, Blackberry Bold, etc.). However, any other type of device may additionally or alternatively be used such as, for example, a tablet (e.g., an Apple® iPad™, a Motorola™ Xoom™, a Blackberry Playbook, etc.), a laptop computer, a desktop computer, a camera, etc. In the illustrated example, the mobile device 130 is owned, leased, and/or otherwise belongs to a respective panelist and/or user. The monitoring entity 105 of the illustrated example does not provide the mobile device 130 to the panelist and/or user. In other examples, panelists are provided with a mobile device 130 to participate in the panel. In the illustrated example, the mobile device 130 is used to read and/or scan a QR code. In response to scanning the QR code, the mobile device 130 displays additional information associated with the QR code in the form of, for example, a webpage.

The on-device meter 132 of the illustrated example of FIG. 1 is software provided to the mobile device 130 by, for example, the monitoring entity 105 when or after, for example, a panelist associated with the mobile device 130 agrees to be monitored. In the example of FIG. 1, the on-device meter 132 collects monitoring information such as user-browser interaction, user-application interaction, device status, user selection, user input, URL information, location information, QR code information, image information, etc. and stores the monitoring information in a memory of the mobile device 130. Periodically and/or aperiodically, the on-device meter 132 transmits the monitoring information to the monitoring data collection site 110. In the illustrated example, the on-device meter 132 may modify configuration settings of the mobile device 130 such as, for example, proxy settings, VPN settings, camera settings, etc. in order to enable access to the camera and/or images captured by the camera, enable communication of monitoring information to the monitoring entity 105, etc.

The example mobile device 131 of the illustrated example of FIG. 1 is a mobile device that does not include an on-device meter 132. In the illustrated example, the mobile device 131 is a smartphone (e.g., an Apple® iPhone®, HTC Sensation, Blackberry Bold, etc.). However, any other type of device may additionally or alternatively be used such as, for example, a tablet (e.g., an Apple® iPad™, a Motorola™ Xoom™, a Blackberry Playbook, etc.), a laptop computer, a desktop computer, a camera, etc. In the illustrated example, the mobile device 131 is a non-panelist device. That is, the user and/or operator of the mobile device 131 are not associated and/or affiliated with the monitoring entity 105. Because of the lack of a relationship with the monitoring entity 105, the mobile device 131 of the illustrated example does not include the on-device meter 132. Not including the on-device meter 132, enables a wider range of users and/or devices to be monitored. For example, persons unwilling to be on a panel may still be monitored. Additionally or alternatively, devices having insufficient resources to run a monitor may be monitored. The mobile device 131, in some examples, may be limited in the type(s) of monitoring information that may be collected (e.g., it may not provide a location of the mobile device 131, an identifier of the user of the mobile device 131, etc.) In examples where an on-device meter 132 is not deployed to the mobile device 131, census-based measurement techniques may nonetheless be used to identify usage of QR codes by the mobile device 131. In such examples, calculations can be performed to impute demographics to the census data based on data collected from the panelists employing on-device meters. An example method of imputing such statistics is disclosed in Sim, U.S. Pat. No. 7,376,722, which is incorporated herein by reference.

The example magazine 150, the example billboard 160, and the example poster 170 of the illustrated example of FIG. 1 are example types of carriers (e.g., types of displays) that may be used to display a QR code. Although the illustrated example of FIG. 1 shows the example magazine 150, the example billboard 160, and the example poster 170, any other type(s) of carrier(s) may additionally and/or alternatively be used to display a QR code such as, for example, a business card, a newspaper, a flyer, product packaging, a website, a kiosk, a television display, artwork, etc. In the illustrated example, the example magazine 150, the example Billboard 160, and the example poster 170 are each associated with a same product and/or a same advertisement. However, in some examples, the example magazine 150, the example Billboard 160, and the example poster 170 are each associated with different products and/or different advertisements from the same or different products.

In the illustrated example, the example magazine 150 includes a first QR code 155, the example billboard 160 includes a second QR code 165, and the example poster 170 includes a third QR code 175. In the illustrated example, the first QR code 155, the second QR code 165, and the third QR code 175 are different from each other (e.g., they encode different information). However, in some examples, the first QR code 155, the second QR code 165, and the third QR code 175 are the same and, thus, encode the same information. The QR codes 155, 165, 175 of the illustrated example encode instructions which, when scanned by the mobile device 130, cause the mobile device 130 to retrieve a webpage based on the instructions. In some examples, a webpage is retrieved from the Web server 120. In the illustrated example, the webpage retrieved in association with each of the QR codes 155, 165, 175 is located at a different respective universal resource locator (URL) for each of the QR codes 155, 165, 175. For example, the first QR code 155, when scanned, instructs the mobile device 130 to retrieve a first webpage at a first URL, while the second QR code 165, when scanned, instructs the mobile device 130 to retrieve a second webpage a second URL different from the first URL. The retrieval of the webpages typically does not require user involvement after the QR code is scanned. In some examples, the first webpage and the second webpage contain the same information (e.g., are the same advertisement), but are hosted at separate URLs. As a result, because the example magazine 150, the example Billboard 160, and the example poster 170 are each associated with the same product, the same information related to that product is displayed irrespective of which of the different QR codes 155, 165, 175 are scanned. However, in some examples, different product information may be displayed based on the type of carrier scanned. Further, because the information is posted at separate URLs, the use of the QR codes 155, 165, 175 associated with the example magazine 150, the example Billboard 160, and the example poster 170 can be recorded and/or identified.

Figure 1A:
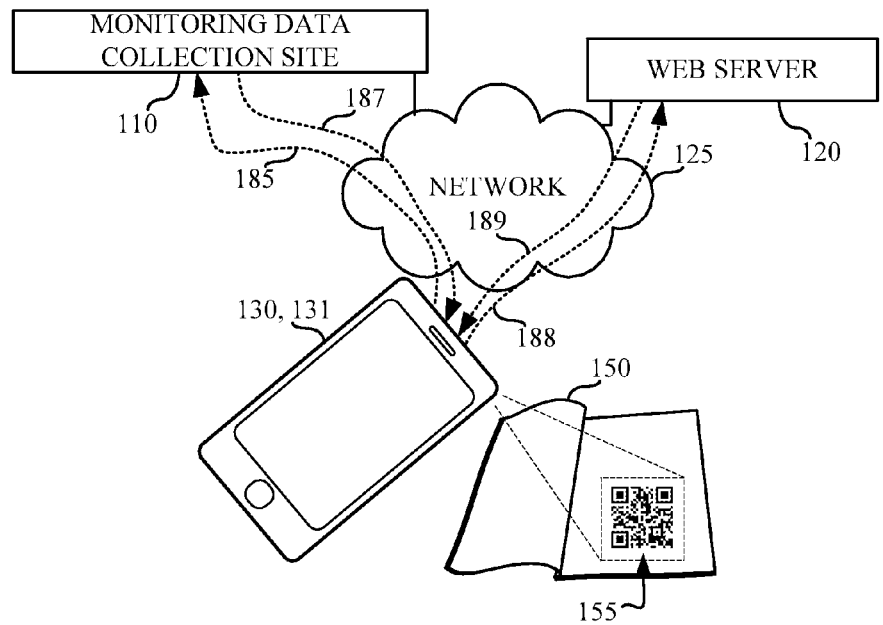
FIG. 1A is a diagram of an example message path implementing a Hypertext Transfer Protocol (HTTP) redirect message.

FIG. 1A is a diagram of an example message path implementing a Hypertext Transfer Protocol (HTTP) redirect message. In the illustrated example of FIG. 1A, the mobile device 130, 131 scans the QR code 155. The QR code 155 of the illustrated example of FIG. 1A indicates that a request should be sent to the monitoring data collection site 110. Accordingly, the mobile device automatically 130, 131 transmits a request 185 to the monitoring data collection site 110. The monitoring data collection site 110 records that a request was received and transmits a redirect message 187 to the mobile device 130, 131. In the illustrated example, the redirect message is an HTTP redirect message. However, any other protocol and/or message for redirecting the mobile device 130, 131 may additionally or alternatively be used. In the illustrated example, the redirect message instructs the mobile device 130, 131 to automatically (i.e., without user intervention) transmit a request 188 to the web server 120. The web server 120 then responds with the information related to the QR code 189 (e.g., a website, an image, etc.).

Figure 1B:
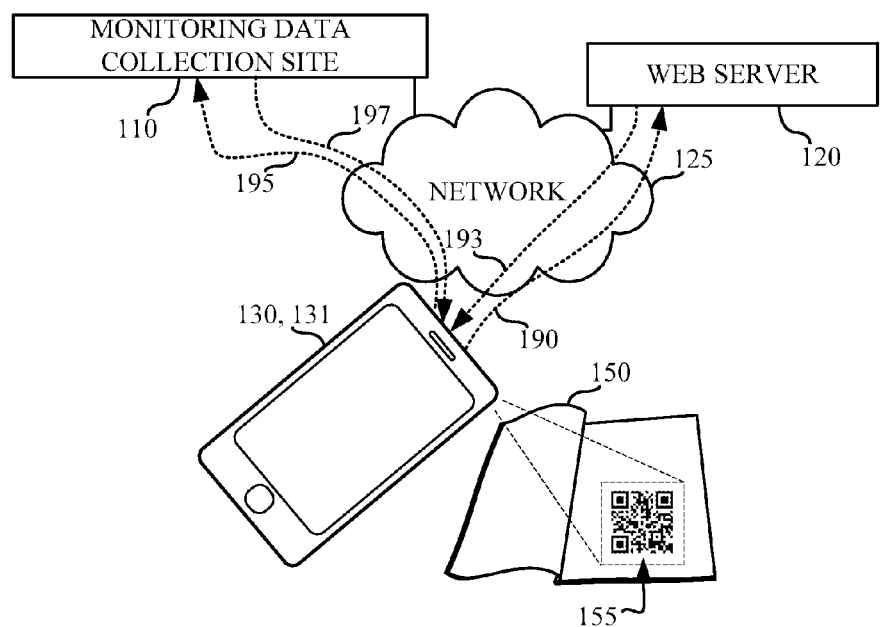
FIG. 1B is a diagram of an example message path implementing a tagging approach.

FIG. 1B is a diagram of an example message path implementing a tagging approach. In the illustrated example of FIG. 1B, the mobile device 130, 131 scans the QR code 155. The QR code 155 of the illustrated example of FIG. 1B indicates that a request should be sent to the web server 120. The mobile device 130, 131 transmits a request 190 to the web server 120. The web server 120 transmits a response 193 to the mobile device 130, 131 that includes information related to the QR code (e.g., a website, an image, etc.). The information related to the QR code includes an instruction to send a request to the monitoring data collection site 110. The instruction may be included in the webpage in accordance with the teachings of Blumenau, U.S. Pat. No. 6,108,637. Accordingly, the mobile device 130, 131 transmits a request 195 to the monitoring data collection site 110. In some such examples, the request 195 is a "dummy request" in that it is not actually intended to return data. Instead it is used to carry monitoring data (e.g., the QR code identifier, a cookie, etc.) to the monitoring data collection site 110. In some examples, the request message is implemented as a POST message, a GET message, or similar message used in present and/or future HTTP protocols. The monitoring data collection site 110 records that a request was received and also records any data contained in the request. The monitoring data collection site 110, in some examples, responds with an acknowledgement message 197. In some examples, the acknowledgement message 197 requests and/or sets a cookie in the user device 130, 131 to enable identification of the user device from QR code access to QR code access.

Figure 2:
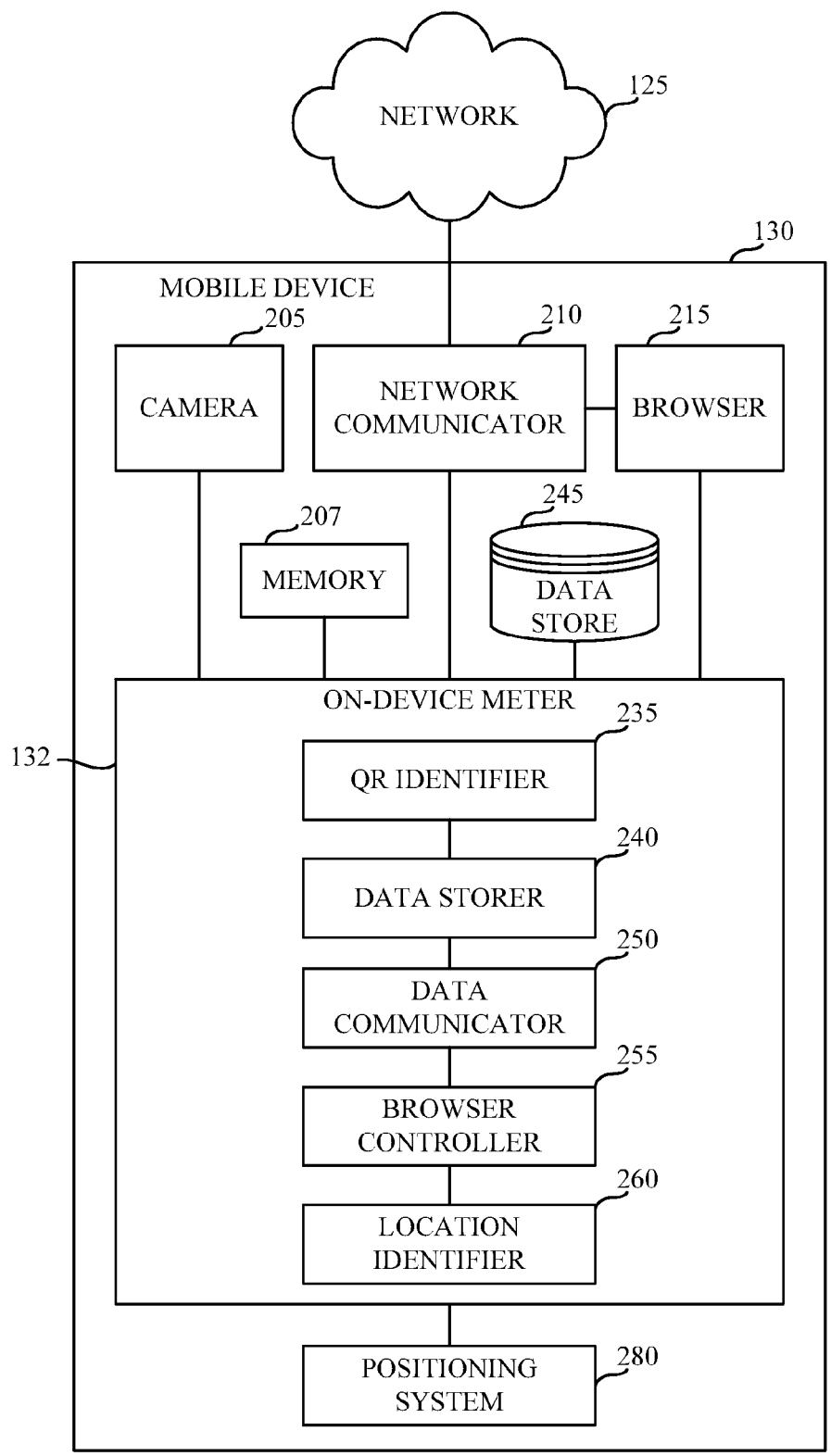
FIG. 2 is a block diagram of an example mobile device of FIG. 1 including an on-device meter that may be used to identify usage of QR codes.

FIG. 2 is a block diagram of an example mobile device 130 of FIG. 1 including an on-device meter 132 that may be used to identify usage of QR codes. The mobile device 130 of the illustrated example includes a camera 205, a memory 207, a network communicator 210, a browser 215, the on-device meter 132, and a positioning system 280. The non-panelist device 131 of FIG. 1 may be similar to the mobile device 130 of FIG. 2, but will not include the on-device meter 132.

The camera 205 of the illustrated example of FIG. 2 is a camera capable of taking images of the surroundings of the mobile device 130. In some examples, images taken by the camera 205 are stored in the memory 207 of the mobile device 130. In the illustrated example, the camera 205 is a charge-coupled device (CCD) camera. However, any other past, present, and/or future type and/or number of imaging device(s) may additionally or alternatively be used. In the illustrated example, the camera 205 is used to scan QR codes when the user of the mobile device 130 aligns the mobile device 130 such that the QR code to be scanned is within a field of view of the camera 205.

The memory 207 of the illustrated example of FIG. 2 may be implemented by any device for storing data such as, for example, flash memory, magnetic media, optical media, etc. Furthermore, the data stored in the memory 207 may be in any data format such as, for example, binary data, comma delimited data, tab delimited data, structured query language (SQL) structures, etc.

The network communicator 210 of the illustrated example of FIG. 2 is implemented by a cellular communicator, to allow the mobile device 130 to communicate with a cellular network (e.g., the network 125). However, additionally or alternatively, the network communicator 210 may be implemented by any other type of network interface such as, for example, an Ethernet interface, a Wi-Fi interface, a Bluetooth Interface, etc.

The browser 215 of the illustrated example of FIG. 2 is implemented by a browser capable of displaying websites and/or other Internet media (e.g., product information, advertisements, videos, images, etc.) via the mobile device 130. In the illustrated example, the browser 215 is implemented as an Android® browser. However, any other browser may additionally or alternatively be used such as, for example, Opera®, Dolphin®, Safari®, etc. Furthermore, browsers that are traditionally associated with use on a desktop and/or laptop computer may additionally and/or alternatively be used such as, for example, Google® Chrome®, Microsoft® Internet Explorer®, and/or Mozilla Firefox®. In the illustrated example, when a QR code encoding a URL is scanned, the browser 215 requests the resource located at the URL via the network communicator 210 and displays and/or renders the resource via the mobile device 130.

The example data store 245 of the illustrated example of FIG. 2 may be implemented by any device for storing data such as, for example, flash memory, magnetic media, optical media, etc. Furthermore, the data stored in the data store 245 may be in any data format such as, for example, binary data, comma delimited data, tab delimited data, structured query language (SQL) structures, etc. While in the illustrated example the data store 245 is illustrated as a single database, the data store 245 may be implemented by any number and/or type(s) of databases.

The positioning system 280 of the illustrated example of FIG. 2 is implemented by a global positioning system (GPS). The positioning system 280 enables identification of the location of the mobile device 130. In some examples, the positioning system 280 determines the location based on positions of satellites in relation to the location of the mobile device. However in some other examples, the positioning system 280 determines location based on position of cellular radio towers in relation to the location of mobile device. However, any other past, present, and/or future method for determining the location of the mobile device 130 (e.g., cellular tower triangulation) may additionally or alternatively be used.

The on-device meter 132 (ODM) of the illustrated example is implemented by a processor executing instructions but it could alternatively be implemented by an application specific integrated circuit(s) (ASIC(s)), programmable logic device(s) (PLD(s)) and/or field programmable logic device(s) (FPLD(s)), and/or other analog and/or digital circuitry. In the illustrated example, the ODM 132 identifies QR codes scanned by the camera 205 of the mobile device 130, stores an identifier of the scanned QR code, and transmits the identifier to the monitoring data collection site 110.

In the illustrated example, the ODM 132 includes a QR identifier 235, a data storer 240, a data store 245, a data communicator 250, a browser controller 255, and a location identifier 260. The example QR identifier 235 in the illustrated example of FIG. 2 is implemented by a processor executing instructions, but it could alternatively be implemented by an ASIC, a PLD, or other analog and/or digital circuitry. In the illustrated example, the example QR identifier 235 receives images of QR codes captured by the camera 205, and decodes the QR code(s) contained in those images to obtain an identifier encoded by the QR code. The example QR identifier 235, in some cases, decodes a URL that is encoded within the QR code and instructs the browser 215 to navigate to that URL.

The example data storer 240 of the illustrated example of FIG. 2 implemented by a processor executing instructions, but it could alternatively be implemented by an ASIC, a PLD, and/or other analog and/or digital circuitry. In the illustrated example, the example data storer 240 stores an identifier that was identified within the scanned QR code by the example QR identifier 235. The example data storer 240 then stores the identifier in the data store 245. In some examples, the example data storer 240 stores additional information in the data store 245 in association with the identifier. For example, the example data storer 240 stores an image of the QR code, a location of the mobile device, a panelist identifier, a network address of the mobile device, and/or an identifier of the mobile device. The data communicator 250 of the illustrated example of FIG. 2 is implemented by an Ethernet driver that interfaces with the network communicator 210. In the illustrated example, the data communicator 250 transmits data stored in the data store 245 to the monitoring data collection site 110 via, for example, the Internet. While in the illustrated example, the data communicator 250 is an Ethernet driver, any other type(s) of interface may additionally or alternatively be used. For example, the data communicator 250 might include one or more of a Bluetooth interface, a Wi-Fi interface, a digital subscriber line (DSL) interface, a T1 interface, etc. While in the illustrated example a single data communicator 250 is shown, any number and/or type(s) of data communicators may additionally or alternatively be used.

The example browser controller 255 of the illustrated example of FIG. 2 is implemented by a processor executing instructions, but it could alternatively be implemented by an ASIC, a PLD, and/or other analog and/or digital circuitry. In the illustrated example, the browser controller 255 determines whether the identifier encoded by the QR code is a URL. When the identifier encoded by the QR code is a URL, the browser controller 255 instructs the browser 215 to navigate to a resource identified by the URL. Accordingly, when the user scans a QR code that encodes a URL, the browser retrieves information located at the URL and presents that information to the user via the mobile device 130.

The example location identifier 260 of the illustrated example of FIG. 2 is implemented by a processor executing instructions, but it could alternatively be implemented by an ASIC, a PLD, or other analog and/or digital circuitry. In the illustrated example, the location identifier 260 interfaces with the positioning system 280 of the mobile device 130. Because the mobile device 130 of the illustrated example is portable, QR codes may be scanned at any location. Identifying the location of the mobile device 130 enables the monitoring entity 105 to identify where particular QR codes were scanned. Such location information may be important because it may indicate, for example, that users are more likely to view advertisements in magazines while at work compared to when those users are at home and/or may identify advertising locations that achieve greater attention.

Figure 3:
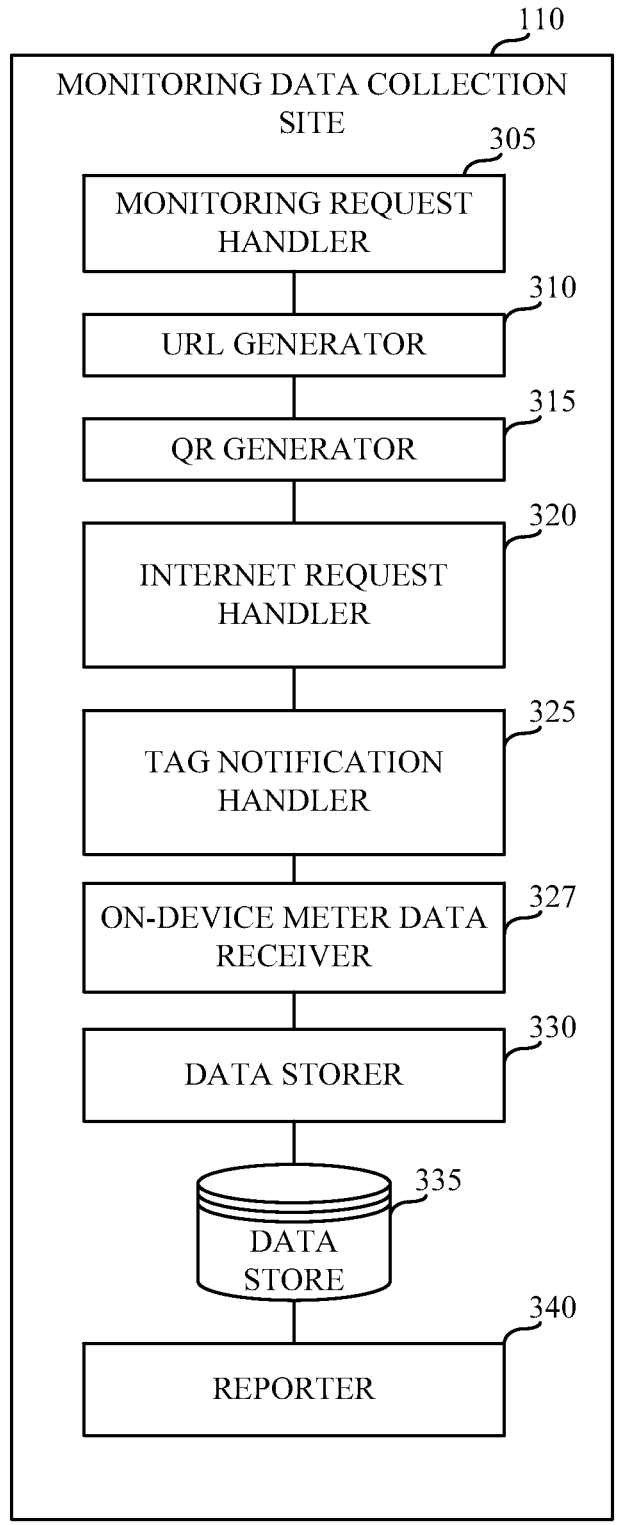
FIG. 3 is a block diagram of an example monitoring data collection site of FIG. 1 that may be used to identify usage of QR codes.

FIG. 3 is a block diagram of an example monitoring data collection site 110 of FIG. 1 that may be used to identify usage of QR codes. The example monitoring data collection site 110 of the illustrated example of FIG. 3 includes a monitoring request handler 305, a URL generator 310, a QR generator 315, an Internet request handler 320, a tag notification handler 325, an on-device meter data receiver 327, a data store 330, a data store 335, and a reporter 340.

The monitoring request handler 305 of the illustrated example of FIG. 3 is implemented by a processor executing instructions, but it could alternatively be implemented by an ASIC, a PLD, and/or other analog and/or digital circuitry. In the illustrated example, the monitoring request handler 305 receives requests for QR code monitoring services associated with a carrier-advertisement pair. Furthermore, the monitoring request handler 305 receives additional information from the content provider and/or advertising entity 115 concerning how it would prefer the monitoring information to be collected. For example, the content provider and/or advertising entity 115 may specify that the monitoring information should be collected using a redirect approach, as opposed to collecting the monitoring information using a tagging approach.

The URL generator 310 of the illustrated example of FIG. 3 is implemented by a processor executing instructions, but it could alternatively be implemented by an ASIC, a PLD, and/or other analog and/or digital circuitry. In the illustrated example, the URL generator 310 generates a URL that is encoded in the QR code generated by the QR generator 315. Based on the preferences of the content provider and/or advertising entity received by the monitoring request handler 305, the URL generator 315 generates a URL that achieves the goal set forth by the content provider and/or advertising entity 115. For example, if the content provider and/or advertising entity 115 specified that the monitoring information should be collected using HTTP redirect messages, the URL generator 310 generates a URL identifying a resource hosted by the monitoring entity 105 (e.g. the monitoring data collection site 110), and that uniquely identifies the carrier-advertisement pair to be monitored. When a request is received at the generated URL, the monitoring data collection site 110 may redirect the requesting device to a second URL as specified by the content provider and/or advertising entity 115. Alternatively, if the content provider and/or advertising entity 115 specified that the monitoring information should be collected using a tagging approach, the URL generator 310 generates a URL identifying a resource that is hosted by the content provider and/or advertising entity 115 (e.g. the web server 120), and that uniquely identifies the carrier-advertisement pair to be monitored. In the illustrated example, the content provider and/or advertising entity 115 is instructed to add tag instructions to the resource identified by the URL so that requests for that resource additionally cause the requesting device to notify the monitoring data collection site 110 of the request.

The QR generator 315 of the illustrated example of FIG. 3 is implemented by a processor executing instructions, but it could alternatively be implemented by an ASIC, a PLD, and/or other analog and/or digital circuitry. In the illustrated example, the QR generator 315 generates a QR code that encodes the URL generated by the URL generator 310. Although in the examples illustrated herein, a QR code is used, any other type of machine-readable code (e.g., barcode) may additionally or alternatively be used.

The Internet request handler 320 of the illustrated example of FIG. 3 is implemented by a processor executing instructions, but it could alternatively be implemented by an ASIC, a PLD, and/or other analog and/or digital circuitry. When a QR code is scanned, the browser of the mobile device sends a request to the URL encoded within the QR code. When, for example, the URL identifies the monitoring data collection site 110, the Internet request handler 320 responds to the request. In some examples, the example Internet request handler 320 responds to such requests with a redirect URL as specified by the content provider and/or advertising entity 115 to the monitoring request handler 305. In the illustrated example, the Internet request handler 320 responds to requests when they are the first request that is triggered by scanning a QR code. The Internet request handler 320, in some examples, responds by redirecting the requesting device (e.g., the mobile device 130, 131) to the content provider and/or advertising entity 115. In some examples, the redirection mechanism implemented by the Internet request handler 320 can be used by the content provider and/or advertising entity 115. For example, the content provider and/or advertising entity 115 may process the request and respond with a redirect URL (e.g., a URL associated with a third party site).

The tag notification handler 325 of the illustrated example of FIG. 3 is implemented by a processor executing instructions, but it could alternatively be implemented by an ASIC, a PLD, and/or other analog and/or digital circuitry. When a QR code is scanned, the browser of the mobile device sends a request to the URL encoded within the QR code. When, for example, the URL identifies the web server 120, the web server 120 responds to the request with an instruction to notify the monitoring data collection site 110 of the request.

The on-device meter data receiver 327 of the illustrated example of FIG. 3 is implemented by a processor executing instructions, but it could alternatively be implemented by an ASIC, a PLD, and/or other analog and/or digital circuitry. Periodically and/or aperiodically, the on-device meter 132 of the mobile device 130 transmits monitoring information to the monitoring data collection site 110. The on-device meter data receiver 327 receives the monitoring information from the on-device meter 132. In some examples, the monitoring information is transmitted via, for example, the Internet. However, in some examples, the monitoring information is physically transported (e.g., via a storage device such as a flash drive, magnetic storage media, optical storage media, etc.) to a location of the monitoring data collection site 110. Typically, the monitoring data collection site 110 will receive data from many user devices (e.g., panelists and/or non-panelists).

The data storer 330 of the illustrated example of FIG. 3 is implemented by a processor executing instructions, but it could alternatively be implemented by an ASIC, a PLD, and/or other analog and/or digital circuitry. In the illustrated example, the example data storer 330 stores information received from the content provider and/or advertising entity 115, the URL generated by the URL generator 310, the QR code generated by the QR generator 315, monitoring information received via the Internet request handler 320, monitoring information received via the tag notification handler 325, and/or monitoring information received via the on-device meter data receiver 327. Furthermore, the data storer 330 of the illustrated example stores identifying information related to the carriers carrying the QR code(s) such as, for example, a type (e.g., whether the carrier being monitored is a billboard, a magazine, a poster, a postcard, a website, a business card, a newspaper, etc.), a unique identifier, a name of the advertisement, a name of the carrier-advertisement pair, etc.

The example data store 335 of the illustrated example of FIG. 3 may be implemented by any storage device and/or storage disc for storing data such as, for example, flash memory, magnetic media, optical media, etc. Furthermore, the data stored in the data store 335 may be in any data format such as, for example, binary data, comma delimited data, tab delimited data, structured query language (SQL) structures, etc. While in the illustrated example the data store 335 is illustrated as a single database, the data store 335 may be implemented by any number and/or type(s) of databases.

The reporter 340 of the illustrated example of FIG. 3 is implemented by a processor executing instructions, but it could alternatively be implemented by an ASIC, a PLD, and/or other analog and/or digital circuitry. In the illustrated example, the reporter 340 generates reports based on the received monitoring information. In some examples, the reports are presented to the content provider and/or advertising entity 115 and/or other entities. The reports may identify different aspects about the carriers carrying the QR code(s) such as, for example, whether a poster in a mall location is more effective than a billboard in a downtown location, whether a television advertisement more effective than a newspaper advertisement, etc.

FIG. 4 illustrates an example data table 400 that may be stored by the example monitoring data collection site 110 of FIG. 1 to instruct the monitoring data collection site 110 on how to identify and/or associate requests with particular QR codes and/or the products/advertisements associated with such QR codes. The example data table 400 of FIG. 4 includes columns that identify properties related to carrier-advertisement pairs such as: an advertisement identifier and/or name 405, a presentation type 410, a presentation identifier 415, a QR code URL 420, a QR code 425, and a redirect URL 430. Seven rows 450, 455, 460, 465, 470, 475, 480 are shown in the example data table 400. However, any number of rows may additionally or alternatively be stored in the example data table 400. In the illustrated example, the first example row 450, the second example row 455, and the third example row 460 are each associated with a first advertisement (e.g., advertisement 1). The fourth example row 465 is associated with a second advertisement (e.g., advertisement 2). The fifth example row 470, the sixth example row 475 and the seventh example row 480 are each associated with a third advertisement (e.g., advertisement 3).

In the illustrated example of FIG. 4, the presentation type column 410 identifies a detailed type and/or location of presentation of the carrier-advertisement pair (e.g., how the carrier is displayed). For example, column 410 of row 480 indicates that the QR code associated with carrier-advertisement pair 480 is displayed (e.g., carried) on page three of the arts section of the Chicago Tribune Newspaper dated Oct. 15, 2012. However, the presentation type column 410 may include more and/or less detailed information. For example, the presentation type column 410 may identify that the QR code is displayed in a newspaper, that the QR code is displayed at a particular location of a page (e.g., near a top right corner, etc.), a periodicity of the publication (e.g., whether the newspaper is published daily, weekly, etc.), etc.

In the illustrated example of FIG. 4, the first advertisement is carried by three different types of carriers: a billboard that was displayed at an intersection of State street and Lake street in Chicago, Ill. (e.g., the first example row 450), page 10 of Wired magazine (e.g., the second example row 455), and a poster that was displayed at the Adams and Wabash elevated (el) train station in Chicago, Ill. (e.g., the third example row 460). Each of the first, the second, and the third rows 450, 455, 460 have an identifier 415 that uniquely identifies the carrier-advertisement pair. The unique identifier 415 is used as part of the example QR URL (e.g., column 420). The QR URL is encoded as the QR code shown in the QR code column 425. Accordingly, the QR code uniquely identifies the row associated with the QR code. As such, when a request is received at the QR URL, the carrier-advertisement pair can be uniquely identified.

In the illustrated example, the first example row 450, the second example row 455, and the third example row 460 have a redirect URL of the web server 120. In the illustrated example, the redirect URL 430 is the same for each of the locations associated with the first advertisement (e.g., rows 450, 455, 460). Thus, when any of the QR codes associated with the first advertisement are scanned, the information at the redirect URL is displayed. However, any other redirect URL may alternatively be used to, for example, display different information based on the scanned QR code (e.g., a webpage displayed when a QR code on a billboard is scanned may be different from a webpage displayed when a QR code in a magazine is scanned). Furthermore, different redirect URLs may be used for different advertisements. For example, advertisement 2 (e.g., the fourth example row 465) is associated with a redirect URL that is different from the redirect URL associated with the first advertisement (e.g., rows 450, 455, 460).

In examples where a tagging approach is used to monitor usage of QR codes, a redirect URL may not be stored. For example, the third advertisement (e.g., the advertisement associated with rows 470, 475, 480) may not be associated with a redirect URL. In such an example, the QR URL may direct the mobile device to display information retrieved from the web server 120 associated with the third advertisement. The web server 120 then instructs the mobile device 130 to inform the monitoring data collection site 110 of the request made at the QR URL.

FIG. 5 is an example data table 500 representing QR code exposures and/or impressions that may be stored by the example monitoring data collection site 110 of FIG. 1. The example data table 500 identifies whether the exposure was monitored via panelist or census data 505 (e.g., whether the data corresponds to activity of a panelist or a non-panelist), an Internet protocol (IP) address 508 of the mobile device 130, 131, a timestamp of the request 510, a panelist identifier 515, a presentation identifier 520, and panelist information 525.

In the illustrated example, identifying whether the exposure was monitored via panelist data or census data 505 may be beneficial for analysis purposes. Census data includes data monitored using the monitoring data collection site 110 and/or the web server 120. The monitoring data collection site 110 and/or the web server 120 may not be aware of whether the requesting device employs the on-device meter 120. Accordingly, there is limited opportunity to, at the time of receiving a request, identify whether or not the request is associated with a panelist. Accordingly, census data includes information pertaining to panelists and non-panelists alike. On the other hand, panelist data is limited to information that was recorded using an on-device meter. Identifying whether the exposure was monitored via panelist or census data may enable reduction of double counted exposures (e.g., when an exposure is monitored by both the panelist system and the census system). Double counted exposures represent an overlap between the census data and the panelist data. For example, a mobile device 130 having an on-device meter 132 may store a record that a QR code was scanned. The request generated in response to the QR code being scanned may also be recorded by the web server 120 and/or the monitoring data collection site 110.

In the illustrated example, double counted exposures are identified using, for example, the IP address of the mobile device 130, 131 in combination with the timestamp 510, the presentation identifier 520, whether the exposure was monitored via panelist or census data 505, etc. For example, row 580 indicates that the QR code associated with carrier-advertisement pair 20004 was scanned on Sep. 3, 2012 at 3:38 PM by a mobile device having IP address 207.200.74.38 that used census based measurement. Row 585 indicates that the QR code associated with the same carrier-advertisement pair 20004 was scanned on Sep. 3, 2012 at 3:38 PM by a mobile device having IP address 207.200.74.38 that used panelist based measurement. In some examples, the monitoring data collection site 110 identifies that since the same carrier-advertisement pair was scanned at approximately the same time using the same IP address, that the exposure (of rows 580 and 585) has been recorded multiple times.

The IP address column 508 of the illustrated example of FIG. 5 represents an IP address of the mobile device 130, 131 when the QR code was scanned. In the illustrated example, the IP address 508 is recorded by the monitoring data collection site 110 because, for example, a request identifying the IP address of the mobile device 130, 131 is sent from the mobile device to the monitoring data collection site 110. Further, the IP address 508 is also recorded by the on-device meter 132, when present. Recording the IP address 508 using the on-device meter 132 is important because IP addresses may, in some examples, be dynamic. A dynamic IP address is an IP address that may change over time. For example, at a first time a device may be assigned a first IP address while at a second time the device may be assigned a second IP address different from the first IP address. In the illustrated example, the on-device meter 132 is structured to record the IP address at the time of scanning the QR code. In some examples, the IP address 508 may provide an approximate geographic location of the mobile device. For example, the IP address 64.208.186.106 may be approximately located in New York City.

The timestamp column 510 of the illustrated example of FIG. 5 represents a time when information associated with the QR code (e.g., a website) was presented. However, the timestamp column 510 may alternatively represent a time when the QR code was scanned by the mobile device 130. Storing a timestamp (e.g., date and/or time) enables analysis of when users scanned a particular QR code (e.g., are users more likely to scan a QR code on a weekend, during a weekday, etc.).

The panelist identifier 515 of the illustrated example of FIG. 5 identifies the panelist that scanned the QR code. While in the illustrated example a panelist identifier is used, any other information that may be used to identify the panelist may additionally or alternatively be used such as, for example, a mobile device identifier, a panelist name, a cookie, etc. The presentation identifier 520 of the illustrated example of FIG. 5 identifies the carrier-advertisement pair that was scanned and its placement by virtue of a look-up in column 415 of FIG. 4. While in the illustrated example the presentation identifier is used, any additional or alternative information may be used to identify the carrier-advertisement pair that was scanned such as, for example, the scanned QR code, the URL encoded by the scanned QR code, etc.

The panelist information 525 of the illustrated example of FIG. 5 represents additional information that was reported by the mobile device. In the illustrated example, the panelist information 525 represents a location of the mobile device 130 at the time that the QR code was scanned using global positioning system (GPS) coordinates. However, any other information and/or any other format may additionally and/or alternatively be used. For example, the additional information may represent whether the mobile device 130 was connected to a wireless network at the time the QR code was scanned, whether there was user interaction with the mobile device for a threshold amount of time after the QR code was scanned, etc.

While an example manner of implementing the example on-device meter 132 of FIG. 1 has been illustrated in FIG. 2 and an example manner of implementing the example monitoring data collection site 110 of FIG. 1 has been illustrated in FIG. 3, one or more of the elements, processes and/or devices illustrated in FIGS. 1, 2, and/or 3 may be combined, divided, re-arranged, omitted, eliminated and/or implemented in any other way. Further, the example QR identifier 235, the example data storer 240, the example data communicator 250, the example browser controller 255, the example location identifier 260 and/or, more generally, the example on-device meter 132 of FIGS. 1 and/or 2, and/or the example monitoring request handler 305, the example URL generator 310, the example QR generator 315, the example internet request handler 320, the example tag notification handler 325, the example on-device meter data receiver 327, the example data storer 330, the example data store 335, the example reporter, and/or, more generally, the example monitoring data collection site 110 of FIGS. 1 and/or 3 may be implemented by hardware, software, firmware and/or any combination of hardware, software and/or firmware. Thus, for example, any of the example QR identifier 235, the example data storer 240, the example data communicator 250, the example browser controller 255, the example location identifier 260 and/or, more generally, the example on-device meter 132 of FIGS. 1 and/or 2, and/or the example monitoring request handler 305, the example URL generator 310, the example QR generator 315, the example internet request handler 320, the example tag notification handler 325, the example on-device meter data receiver 327, the example data storer 330, the example data store 335, the example reporter, and/or, more generally, the example monitoring data collection site 110 of FIGS. 1 and/or 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example QR identifier 235, the example data storer 240, the example data communicator 250, the example browser controller 255, the example location identifier 260 and/or, more generally, the example on-device meter 132 of FIGS. 1 and/or 2, and/or the example monitoring request handler 305, the example URL generator 310, the example QR generator 315, the example internet request handler 320, the example tag notification handler 325, the example on-device meter data receiver 327, the example data storer 330, the example data store 335, the example reporter, and/or, more generally, the example monitoring data collection site 110 of FIGS. 1 and/or 3 are hereby expressly defined to include a tangible computer readable medium (e.g., a storage device or storage disc) such as a memory, DVD, CD, Blu-ray, etc. storing the software and/or firmware. Further still, the example QR identifier 235, the example data storer 240, the example data communicator 250, the example browser controller 255, the example location identifier 260 and/or, more generally, the example on-device meter 132 of FIGS. 1 and/or 2, and/or the example monitoring request handler 305, the example URL generator 310, the example QR generator 315, the example internet request handler 320, the example tag notification handler 325, the example on-device meter data receiver 327, the example data storer 330, the example data store 335, the example reporter, and/or, more generally, the example monitoring data collection site 110 of FIGS. 1 and/or 3 may include one or more elements, processes and/or devices in addition to, or instead of, those illustrated in FIGS. 1, 2, and/or 3, and/or may include more than one of any or all of the illustrated elements, processes and devices.

Figure 6:
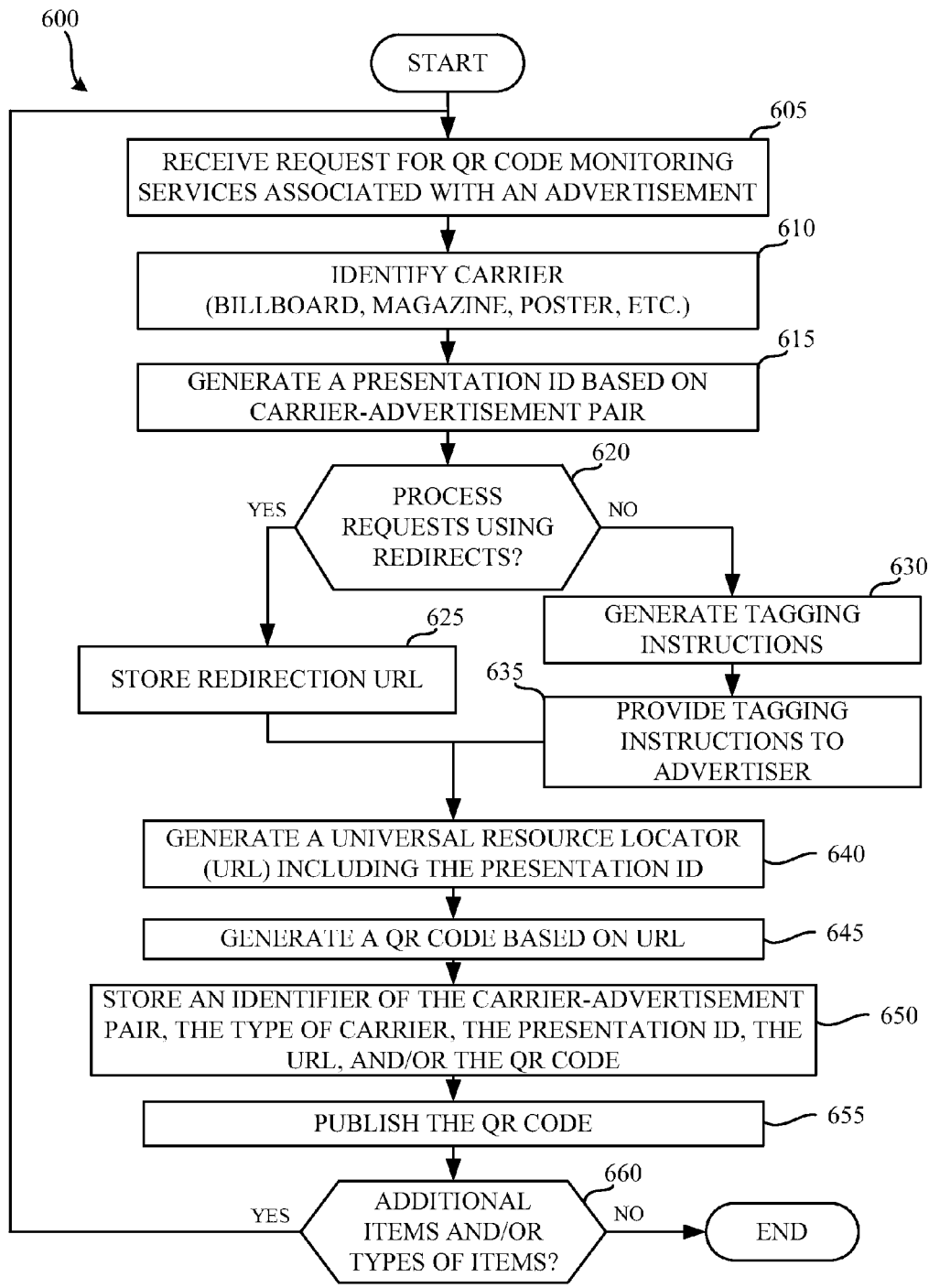
FIG. 6 is a flowchart representative of example machine-readable instructions that may be executed to implement the example monitoring data collection site of FIG. 1.
Figure 7:
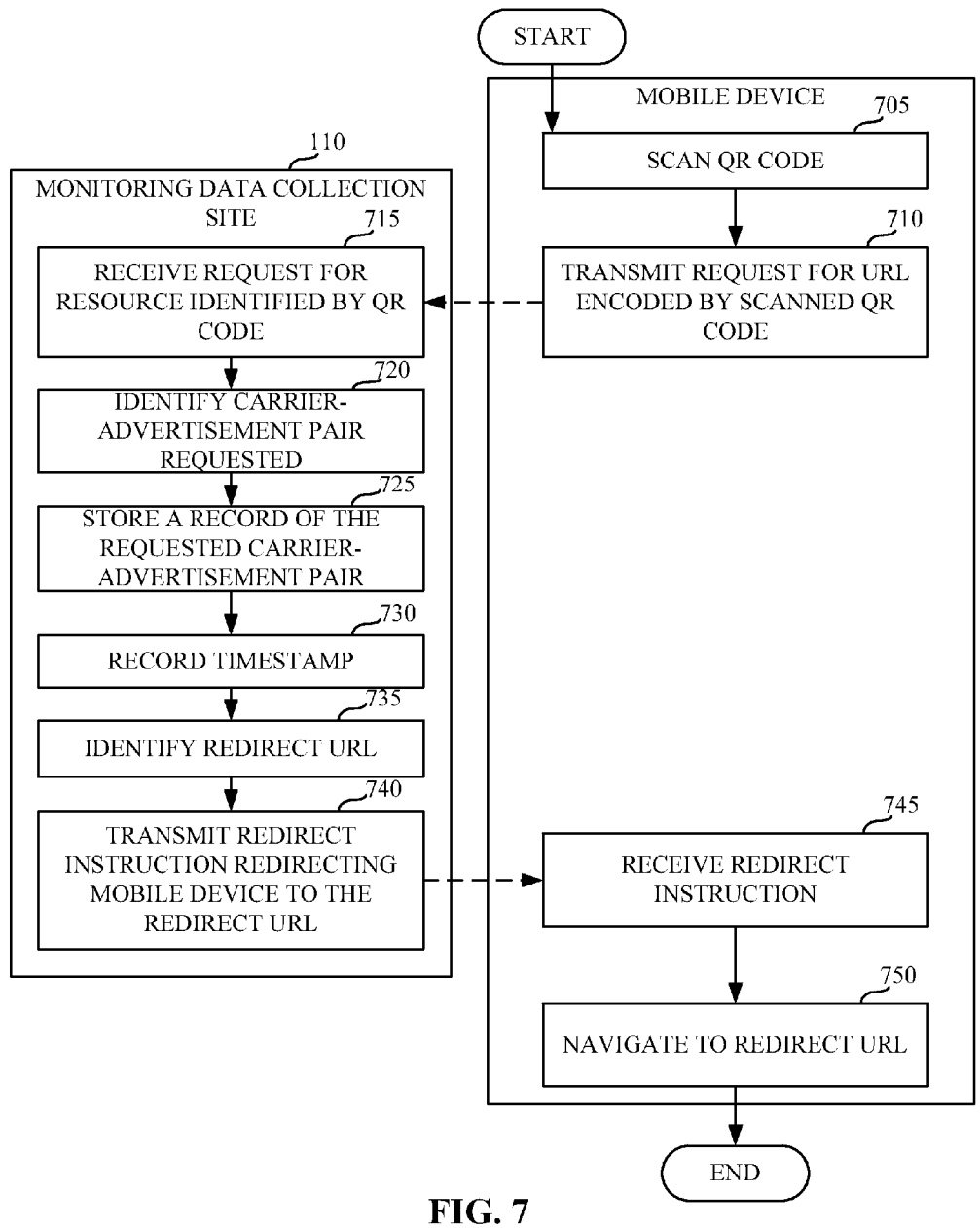
FIG. 7 is a flowchart representative of example machine-readable instructions that may be executed to implement the example monitoring data collection site of FIG. 1.
Figure 8:
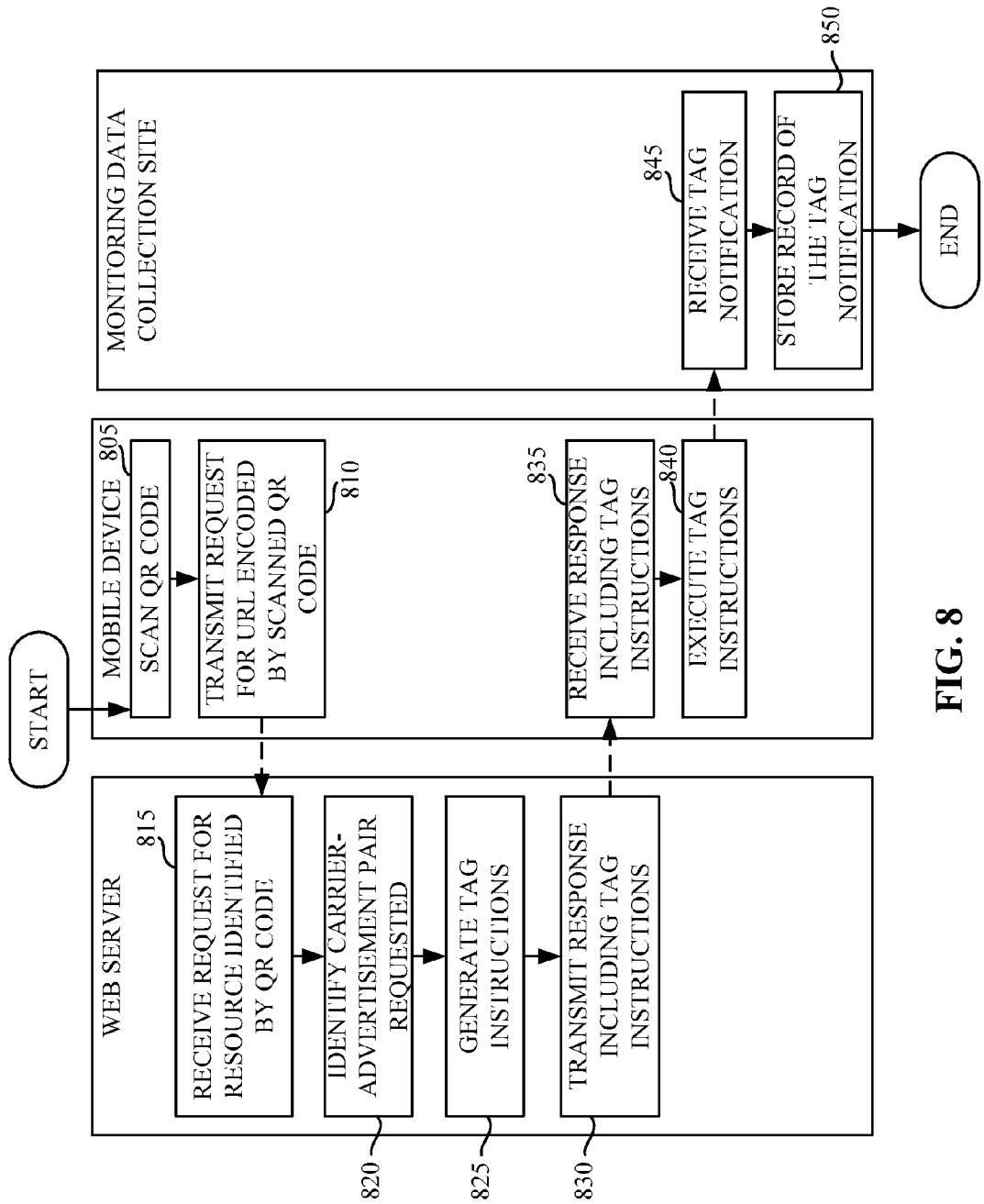
FIG. 8 is a flowchart representative of example machine-readable instructions that may be executed to implement the example web server of FIG. 1.

Flowcharts representative of example machine-readable instructions for implementing the example on-device meter 132 of FIGS. 1 and/or 2, and/or the example monitoring data collection site 110 of FIGS. 1 and/or 3 are shown in FIGS. 6, 7, 8, and/or 9. In these examples, the machine-readable instructions comprise a program for execution by a physical hardware processor such as the processor 1012 shown in the example processor platform 1000 discussed below in connection with FIG. 10. A processor is sometimes referred to as a microprocessor or a central processing unit (CPU). The program may be embodied in software stored on a tangible computer-readable medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6, 7, 8, and/or 9, many other methods of implementing the example the example on-device meter 132 of FIGS. 1 and/or 2, and/or the example monitoring data collection site 110 of FIGS. 1 and/or 3 may alternatively be used. For example, the order of execution of the blocks may be changed, and/or some of the blocks described may be changed, eliminated, or combined.

As mentioned above, the example processes of FIGS. 6, 7, 8, and/or 9 may be implemented using coded instructions (e.g., computer-readable instructions) stored on a tangible computer-readable storage medium such as a hard disk drive, a flash memory, a read-only memory (ROM), a compact disk (CD), a digital versatile disk (DVD), a cache, a random-access memory (RAM)) and/or any other storage device or disc in which information is stored for any duration (e.g., for extended time periods, permanently, brief instances, for temporarily buffering, and/or for caching of the information). As used herein, the term tangible computer-readable storage medium is expressly defined to include any type of computer-readable storage disc or device and to exclude propagating signals. Additionally or alternatively, the example processes of FIGS. 6, 7, 8, and/or 9 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable storage and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 6 is a flowchart 600 representative of example machine-readable instructions that may be executed to implement the example monitoring data collection site 110 of FIG. 1. The example process 600 begins when the monitoring request handler 305 of the monitoring data collection site 110 receives a request for QR code monitoring services associated with an advertisement on which a QR code is to be displayed. (block 605). In the illustrated example, the request is received from the content provider and/or advertising entity 115. However, the request may be received from any other entity. From the request, the monitoring request handler 305 identifies a carrier (e.g., a type of display) of the advertisement. (block 610). For example, the monitoring request handler 305 may identify that the carrier will be, for example, a billboard, a magazine, a poster, a postcard, a website, a business card, a newspaper, etc. The monitoring request handler 305 generates a presentation identifier based on the carrier-advertisement pair. (block 615). In the illustrated example, the monitoring request handler may receive a request that identifies that a particular advertisement will be displayed on multiple types of displays (e.g., carriers). As shown in the example of FIG. 4, rows 450, 455, and 460 correspond to a sane advertisement that is displayed on three separate types of display (e.g., a billboard, a magazine, and a poster). Accordingly, in the example of FIG. 4, three separate presentation IDs are used.

The monitoring request handler 305 of the illustrated example then determines whether QR codes associated with the carrier-advertisement pairs will be monitored by using a redirect approach or a tagging approach. In the illustrated example, the request for monitoring services associated with a QR code displayed on a carrier-advertisement pair may specify whether QR codes associated with the carrier-advertisement pair will be monitored by using the redirect approach or the tagging approach. However, in some examples, when the request does not specify which approach is to be used, a default approach may be selected. The redirect approach is described in further detail in connection with FIG. 7. The tagging approach is described in further detail in connection with FIG. 8.

If the redirect approach is chosen, the monitoring request handler 305 stores a redirection URL associated with the carrier-advertisement pair. (block 625). In the illustrated example the redirect URL is provided by the content provider and/or advertising entity 115 in association with the carrier-advertisement pair such that, when a QR code is scanned, the correct information is displayed to the user. In the illustrated example of FIG. 4, each of the first carrier-advertisement pair (e.g. rows 450, 455, 460) are each associated with a same redirect URL. As further shown in FIG. 4, a different redirect URL is stored for the second carrier-advertisement pair (e.g., row 465).

If the tagging approach is chosen, the monitoring request handler 305 generates tag instructions (e.g., monitoring instruction to be included in a webpage). (block 630). The tag instructions, when executed by a browser, cause the browser to notify the monitoring data collection site 110 of their execution (e.g., by sending a "dummy" HTTP request with monitoring data such as the presentation ID identifying the carrier-advertisement pair in its payload, wherein the dummy request does not return data to the requesting device). The tag instructions are then provided to the content provider and/or advertising entity 115 by the monitoring request handler 305. (block 635). The content provider and/or advertising entity 115 then inserts the tag instructions into a resource (e.g., a webpage) that is to be transmitted to a browser when a particular QR code is scanned. With respect to row 470 of FIG. 4, when the QR code is scanned, the mobile device retrieves a webpage from a QR URL. The QR URL includes the presentation ID 30005. The webpage returned when the QR URL is queried includes the tag instructions, which cause the mobile device to notify the monitoring data collection site 110 that the QR code identified by presentation ID 30005 was scanned (e.g., by sending a dummy HTTP request).

The URL generator 310 then generates a URL including the unique ID. (Block 640). In some examples, the URL generated by the URL generator 310 identifies a resource hosted by the monitoring data collection site 110. In some other examples, the URL generated by the URL generator 310 identifies a resource hosted by the website 120.

The QR generator 315 then generates a QR code based on the URL. (block 645). The generated QR code encodes the URL and, when scanned, causes the scanning device (e.g., the mobile device) to retrieve the resource hosted at the URL encoded by the QR code. The data store 330 stores identifier of the type of display, unique ID, URL, the QR code, and/or the redirect URL in the data store 335. The monitoring request handler 305 then instructs the content provider and/or advertising entity 115 to publish the QR code in association with the carrier-advertisement pair. (block 650). The monitoring request handler 305 determines whether additional advertisements and/or carrier-advertisement pairs are to be monitored. (block 655). If additional advertisements and/or carrier-advertisement pairs are to be monitored, control returns to block 605 where the monitoring request handler 305 receives additional requests for QR code monitoring services associated with the advertisement(s) and/or carrier-advertisement pair(s).

FIG. 7 is a flowchart representative of example machine-readable instructions that may be executed to implement the example monitoring data collection site 110 of FIG. 1 and/or the mobile device 130, 131 of FIG. 1. The example process begins when the camera 205 of the mobile device 130 scans a QR code. (block 705). In response to the scanned QR code, the browser 215 transmits a request to the URL encoded by the scanned QR code via the network communicator 210. (block 710). In the illustrated example of FIG. 7, the URL identifies the resource hosted at the monitoring data collection site 110.

The Internet request handler 320 receives the request from the mobile device 130 for the resource identified by the URL. (block 715). The Internet request handler 320 then identifies the scanned carrier-advertisement pair by inspecting the URL to which the request was directed. (block 720). In some examples, the carrier-advertisement pair is identified based on a portion of the URL (e.g., an identifier within the URL such as, for example, the presentation ID 520). Based on the identification of the carrier-advertisement pair, the data storer 330 stores a record of the requested carrier-advertisement pair in the data store 335.

With respect to the illustrated example of FIG. 5, the data storer 330 stores information similar to rows 565, 575, and/or 580. For example, the data storer 330 identifies that the monitoring is being performed via a census approach and, accordingly, does not store a panelist identifier and/or additional panelist information. In some examples, user identifying information may be retrieved (e.g., cookie data). In some examples, user identifying information is retrieved from a database proprietor implementing a user registration model such as, for example, Facebook, Google, Yahoo!, MSN, Twitter, Apple iTunes, Experian, etc. In some examples, such user identifying information is recorded to enable identification of the usage of QR codes. In the illustrated example, the data storer 330 records a timestamp in association with the record. (block 730). Timestamping (e.g., recording a date and/or a time that an event occurred) enables accurate identification and/or correlation of when a QR code was scanned.

The Internet request handler 320 then transmits a redirect instruction including the redirect URL to the mobile device 130, thereby instructing the mobile device 130 to request a resource located at the redirect URL. (block 740). In the illustrated example, the redirect URL is transmitted using a HyperText Transfer Protocol (HTTP) redirect instruction. However, any other type and/or protocol of message may additionally or alternatively be used. For example, the redirect instruction may be implemented using a HyperText Markup Language (HTML) page including JavaScript instructions. For example, a JavaScript "onLoad" function that executes when a webpage is loaded by the browser 215 may cause the redirect URL to be requested. In some examples, the HTML page may indicate to the user that they are being redirected to a different site. For example, a message such as "you will be redirected to xyz.com in two seconds" may be displayed as part of the HTML page. The redirect URL transmitted in the redirect instruction corresponds to the redirect URL associated with the carrier-advertisement pair, as shown in FIG. 4.

The browser 215 of the mobile device 130 then receives the redirect instruction from the Internet request handler 320. (block 745). Based on the received redirect instruction, the browser 215 navigates to and/or transmits a request to the redirect URL specified by the redirect instruction. The browser 215 then displays information received in response to the redirected request.

FIG. 8 is a flowchart representative of example machine-readable instructions that may be executed to implement the example web server 120 of FIG. 1. The example process begins when the camera 205 of the mobile device 130 scans a QR code. (block 805). In response to the scanned QR code, the browser 215 transmits a request for the URL encoded by the scanned QR code via the network communicator 210. (block 810). In the illustrated example of FIG. 8, the URL identifies the resource hosted at the web site 120 (e.g., a site other than the monitoring data collection site 110).

The web server 120 then receives the request from the mobile device 130 for the resource identified by the QR code. (block 815). The web server 120 identifies the carrier-advertisement pair requested based on the URL at which the resource was requested. (block 820). The web server 120 then generates tag instructions for inclusion as part of the response to the previously received request. (block 825). In the illustrated example, the web server generates the tag instructions by retrieving the instructions from a memory of the web server 120. For example, the tag instructions may be stored as part of a Hypertext Markup Language (HTML) file stored by the web server 120. However, in some examples, the web server 120 generates the tag instructions in response to each received request individually. For example, the tag instructions may be generated on the fly when responding to the request. In the illustrated example, the tag instructions cause the mobile device 130 to notify the monitoring data collection site 110 that the QR code was scanned. Accordingly, the tag instructions include an identifier of the carrier-advertisement pair requested in association with the QR code. In some examples, the tag instructions include additional information such as, for example, a timestamp, an address and/or name of the web server 120, cookie information received as part of the request, an identifier of the advertisement entity 115, etc. In the illustrated example, the tag instructions are implemented using JavaScript code. However, any other type and/or format of instructions may additionally or alternatively be used. The web server 120 then transmits a response including the tag instructions to the mobile device 130. (block 830).

The browser 215 of the mobile device 130 then receives the response to its previous request (block 835). The browser 215 of the mobile device 130 executes the tag instructions included in the response (block 840), thereby sending a notification to the tag notification handler 325 of the monitoring data collection site 110. The tag notification handler 325 then receives the tag notification. (block 845). In the illustrated example, the tag notification handler 325 processes the received notification to identify information included in the notification. The data storer 330 then stores a record of the tag notification. (block 850).

Referring to the illustrated example of FIG. 5, the data storer 330 stores information similar to rows 565, 575, and/or 580. For example, the data storer 330 identifies that the monitoring is being performed via a census approach and, accordingly, does not store a panelist identifier and/or additional panelist information. In some examples, user identifying information may be retrieved (e.g., cookie data). In some examples, user identifying information is retrieved from a database proprietor implementing a user registration model such as, for example, Facebook, Google, Yahoo!, MSN, Twitter, Apple iTunes, Experian, etc. In some examples, this user identifying information is recorded to enable identification of the usage of QR codes. In the illustrated example the data storer 330 records a timestamp in association with the record. Timestamping (e.g., recording a time and/or a date that an event occurred) enables accurate identification and/or correlation of when a QR code was scanned.

Figure 9:
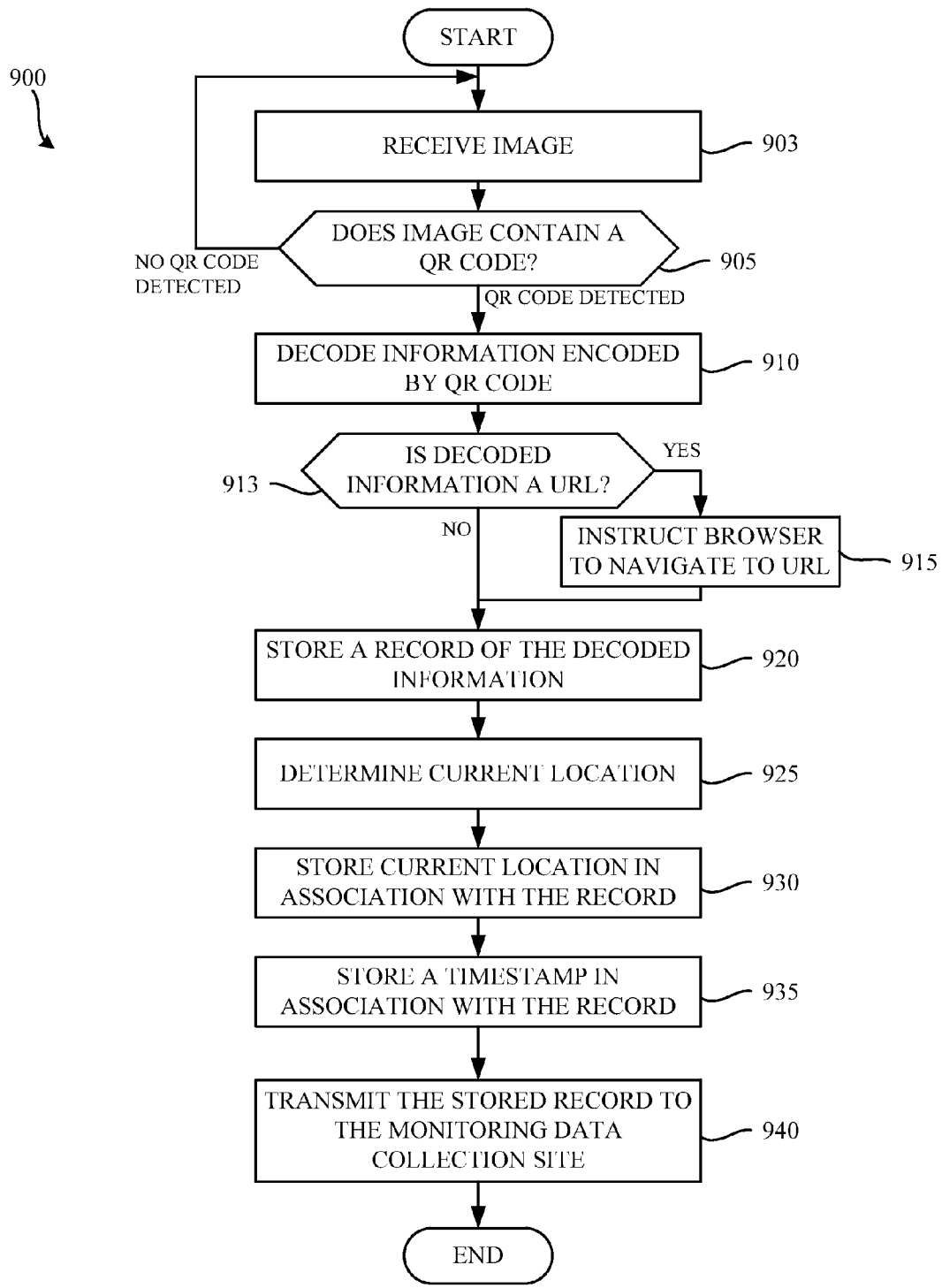
FIG. 9 is a flowchart representative of example machine-readable instructions that may be executed to implement the example on-device meter of FIG. 2.

FIG. 9 is a flowchart 900 representative of example machine-readable instructions that may be executed to implement the example on-device meter 132 of FIG. 2. The example process 900 begins when the QR identifier identifies that an image has been captured by the camera 205. (block 903) The QR identifier 235 receives the image from the camera 205 and analyzes the image using image-processing techniques to determine whether a QR code has been captured. (block 905). In some examples, the QR identifier retrieves the image from a memory of the mobile device rather than directly from the camera 205. If no QR code was identified, the QR identifier 235 waits for another image to be captured. If a QR code was identified, the QR identifier 235 then decodes the information encoded by the QR code. (block 910).

The QR identifier determines whether the decoded information is in the format of a URL. (block 913). If the decoded information is formatted as a URL, the browser controller 255 instructs the browser 215 to navigate to the URL encoded by the QR code. (block 915). In the illustrated example, the browser controller 255 instructs the browser 215 to navigate to the URL via an application programming interface (API) of the browser. However, in some examples, the browser controller 255 instructs the browser 215 to navigate to the URL using a system call via an operating system of the mobile device 130. If the decoded information is not formatted as a URL (e.g., the decoded information is formatted as an address, a telephone number, etc.), control proceeds to block 920, where the data storer 240 stores a record of the decoded information in the data store 245. (block 920). In the illustrated example, the data storer 240 stores the decoded information from the QR code. However, in some examples, the data storer 240 may additionally or alternatively store the QR code, a portion of the decoded information (e.g., a portion of a URL encoded by the QR code), etc.

The location identifier 260 then determines a current location of the mobile device 130. (block 925). In the illustrated example, the location identifier 260 determines the location using a GPS system of the mobile device 130. However, in some examples, the location identifier 260 may additionally or alternatively use any other approach to determine the location such as, for example, using wireless networks (e.g., known locations of Wi-Fi networks, cellular triangulation, etc.). The data storer 240 then stores the location of the mobile device 130 in association with the record of the decoded information. (block 930). In some examples, determining the location of the mobile device 130 may not be possible (e.g., when no GPS satellites are available, etc.). In such examples, the location information may be omitted, and/or a record indicating that no location information was available may be stored in association with the record of the decoded information.

The data storer 240 then stores a timestamp in association with the record of the decoded information in the data store 245. (block 935). In the illustrated example, the timestamp represents a date and/or a time at which the QR code was scanned. However, any other date and/or time may additionally or alternatively be represented such as, for example, a date and/or a time at which a location of the mobile device 130 was identified, a date and/or a time at which the information encoded by the QR code was identified, etc. Storing a timestamp enables accurate correlation of the date and/or the time at which an carrier-advertisement pair associated with the QR code was viewed.

The data communicator 250 transmits the stored record to the monitoring data collection site 110. (block 940). In the illustrated example, the data communicator 250 transmits the stored record in an aperiodic fashion. That is, the stored record and other stored records (e.g., records identifying other QR codes that were previously scanned) are transmitted once a threshold amount of records are stored in the data store 245 of the mobile device 130. However, the data communicator 250 may transmit the stored record in any other fashion. For example, the data communicator 250 may transmit the stored records on a periodic basis (e.g., daily, hourly, weekly, etc.). In the illustrated example, the data communicator 250 transmits the stored records once a threshold amount of data (e.g., 1 KB, 64 KB, 1 MB, etc.) is stored in the data store 245. However, any other threshold may additionally or alternatively be used, such as, for example, a threshold number of records. Additionally or alternatively, the data communicator 250 may transmit the record(s) in response to an external event such as, for example, when a QR code is scanned, when a request for additional records is received from the monitoring data collection site, when a wireless network is available, etc.). In some examples, the periodic and aperiodic approaches may be used in combination.

Figure 10:
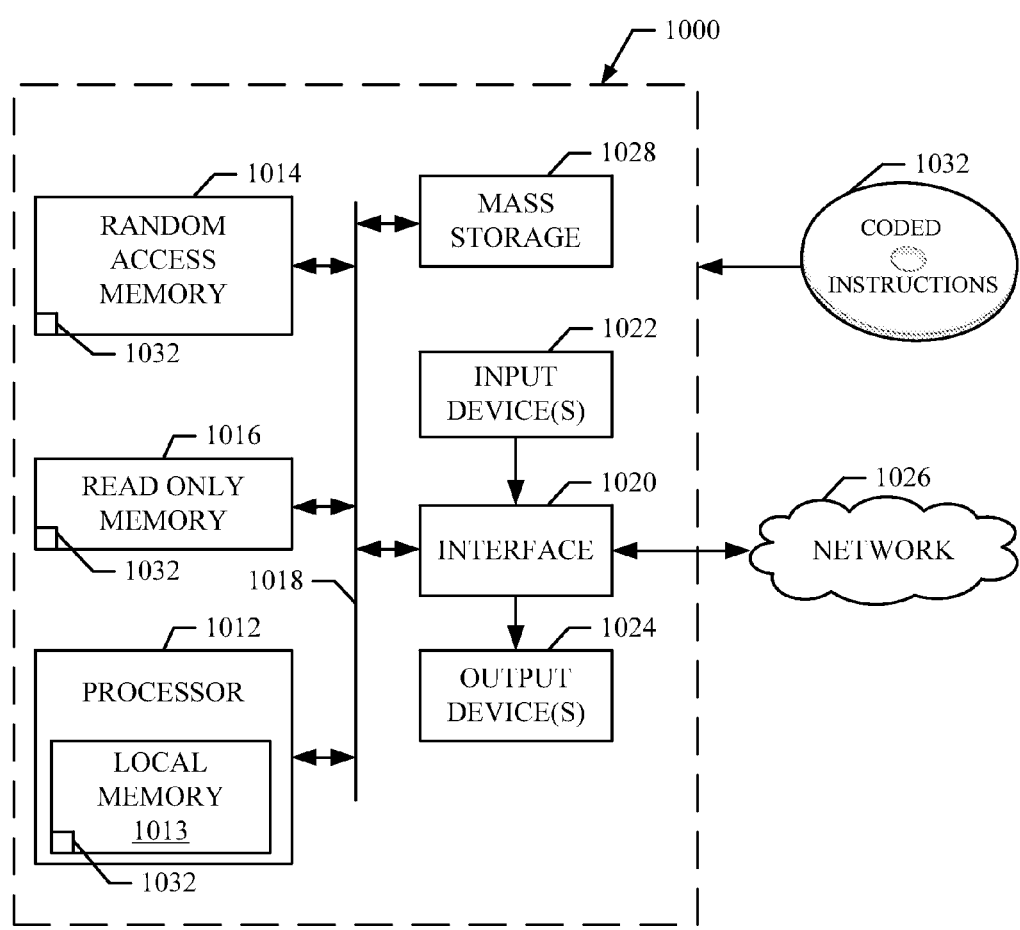
FIG. 10 is a block diagram of an example processor platform that may execute, for example, the machine-readable instructions of FIGS. 6, 7, 8, and/or 9 to implement the example monitoring data collection site of FIG. 1, the example web server of FIG. 1, and/or the example on-device meter of FIG. 2.

FIG. 10 is a block diagram of an example processor platform 1000 capable of executing the instructions of FIGS. 6, 7, 8, and/or 9 to implement the example on-device meter 132 of FIGS. 1 and/or 2, the example monitoring data collection site 110 of FIGS. 1 and/or 3, and/or the example web server 120 of FIG. 1. The processor platform 1000 can be, for example, a server, a personal computer, a mobile phone (e.g., a cell phone), a personal digital assistant (PDA), an Internet appliance, a personal video recorder, or any other type of computing device.

The processor platform 1000 of the instant example includes a silicon-based processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint, a camera, a global positioning sensor, and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., the data communicator 250, the monitoring request handler 305, the internet request handler 325, the tag notification handler 325, the on-device meter data receiver 327) such as a modem or network interface card to facilitate exchange of data with external computers via a network 1026 (e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives, and digital versatile disk (DVD) drives. The mass storage device 1028 may implement the data store 245 and/or the data store 335.

The coded instructions 1032 of FIGS. 6, 7, 8, and/or 9 may be stored in the mass storage device 1028, in the volatile memory 1014, in the non-volatile memory 1016, and/or on a removable storage medium such as a CD or DVD.

Although certain example methods, apparatus, and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A tangible machine-readable storage medium comprising instructions which, when executed, cause a device to at least:
    identify that an image has been captured by a camera of the device;
    determine that the image contains a quick response (QR) code;
    decode information encoded by the QR code;
    store a record of the decoded information in a memory of the device;
    send a request to a universal resource locator (URL) specified by the QR code;
    in response to sending the request to the URL, receive a response including a tagging instruction to instruct the device to send the record to a monitoring server; and
    respond to the tagging instruction by sending the record to the monitoring server to log access to the QR code.

2. The machine-readable medium as defined in claim 1, further including instructions which, when executed, cause the device to at least:
    determine a location of the device; and
    store the location in association with the record.

3. The machine-readable medium as defined in claim 2, wherein the location is determined using a positioning system.

4. The machine-readable medium as defined in claim 1, further including instructions which, when executed, cause the device to store a panelist identifier in association with the record, the panelist identifier identifying a user of the device.

5. The machine-readable medium as defined in claim 1, further including instructions which, when executed, cause the device to send the request by:
    instructing a browser of the device to navigate to the URL.

6. The machine-readable medium as defined in claim 1, further including instructions which, when executed, cause the device to transmit the record to a monitoring data collection site.

7. The machine-readable medium as defined in claim 1, further including instructions which, when executed, cause the device to store a timestamp in association with the record.

8. The machine-readable medium as defined in claim 7, wherein the timestamp represents a time at which the image was captured by the camera.

9. A method to identify usage of quick response (QR) codes, the method comprising:
    receiving, with a monitoring request handler, a first request from a requestor in response to scanning of a QR code;
    generating, with the monitoring request handler, a JavaScript instruction to, when executed, cause a device associated with the request to transmit a dummy request to a universal resource locator (URL) of a monitoring entity;
    providing, with the monitoring request handler, the JavaScript instruction and a webpage to the device of the requestor;
    generating the URL of the monitoring entity, with a URL generator, based on a unique identifier associated with a carrier-advertisement pair associated with the QR code;
    receiving, at an Internet request handler of the monitoring entity, the dummy request from the device of the requestor at the URL of the monitoring entity, the monitoring entity not providing content to the device in response to the dummy request, the Internet request handler to identify the carrier-advertisement pair based on the URL of the monitoring entity; and
    storing a record of the dummy request in a data store with a data storer of the monitoring entity, the record identifying the carrier-advertisement pair associated with the dummy request.

10. The method as defined in claim 9, wherein the record identifies a type of the carrier.

11. The method as defined in claim 9, wherein the JavaScript instruction is a HyperText Transfer Protocol (HTTP) redirect message.

12. The method as defined in claim 9, wherein the device includes an on-device meter data receiver to receive records of QR codes identified by an on-device meter.

13. The method as defined in claim 12, wherein the records identify a panelist associated with the on-device meter.

14. The method as defined in claim 12, wherein the records identify geographic locations at which the on-device meter identified the respective QR codes.

15. The method as defined in claim 9, further including generating a report based on the record using a reporter.

16. A tangible machine-readable storage medium comprising instructions which, when executed, cause a machine to at least:
    inspect a received request to identify a quick response (QR) code associated with the request, the request being received from a device in response to a first instruction included in the QR code;
    determine, in response to the received request, a universal resource locator (URL) associated with the identified QR code, the URL identifying an address of a monitoring server; and
    transmit a second instruction to the device, the second instruction to instruct the device to transmit a dummy message to the monitoring server identified by the URL, wherein the monitoring server stores a record indicating access to the identified QR code but does not provide content to the device in response to the transmitted dummy message, wherein the QR code is identified by inspecting a request URL at which the received request was received.

17. The tangible machine-readable storage medium as defined in claim 16, wherein the QR code is identified based on a portion of the request URL.

18. The tangible machine-readable storage medium as defined in claim 17, wherein the portion of the request URL is a unique identifier.

19. A method to identify usage of quick response (QR) codes, the method comprising:

inspecting, by executing an instruction with a processor, a received request to identify a QR code associated with the request, the request being received from a device in response to an instruction included in the QR code; and in response to receiving the request from the device, transmitting, by executing an instruction with the processor a webpage to the device, the webpage including a tagging instruction to instruct the device to send a response to a monitoring server of the usage of the QR code.

20. The method as defined in claim 19, wherein the tagging instruction is implemented using a JavaScript instruction.

21. The method as defined in claim 19, wherein the tagging instruction is determined based on a request uniform resource locator (URL) at which the received request was received.

22. The method as defined in claim 21, wherein the tagging instruction is determined based on a portion of the request URL.

23. The method as defined in claim 22, wherein the portion of the request URL is a unique identifier.

24. The method as defined in claim 19, further including storing a time stamp in association with the record of the identified QR code.

25. A method to identify usage of quick response (QR) codes, the method comprising:

generating a carrier-advertisement pair that identifies a combination of an advertisement and a carrier that is to be used to display the advertisement, the advertisement to include a QR code;

generating a universal resource locator (URL) including an identifier of the carrier-advertisement pair, the URL identifying an address hosted by a content provider;

generating the QR code, the QR code encoding an instruction which, when executed, causes a device to transmit a query to the universal resource locator; and instructing the content provider to respond to requests received at the URL with a tagging instruction, the tagging instruction to instruct the device to send a response to a monitoring server of the usage of the QR code.

26. The method as defined in claim 25, further including instructing the content provider to publish the QR code in association with the carrier-advertisement pair.

27. The method as defined in claim 25, further including storing the identifier of the carrier-advertisement pair in a database.

28. A method to identify use of quick response (QR) codes, the method comprising:

identifying, by executing an instruction with a processor, that an image has been captured by a camera of a device;

determining, by executing an instruction with the processor, that the image contains a QR code;

decoding, by executing an instruction with the processor, information encoded by the QR code, the information encoded by the QR code including a universal resource locator (URL);

sending, by executing an instruction with the processor, a request to the URL; and executing, by executing an instruction with the processor, a tagging instruction received as part of a webpage in response to the request, the tagging instruction to send a response to a monitoring server of the usage of the QR code.

* * * * *

UNITED STATES PATENT AND TRADEMARK OFFICE
CERTIFICATE OF CORRECTION

PATENT NO. : 9,715,554 B2  
APPLICATION NO. : 14/927831  
DATED : July 25, 2017  
INVENTOR(S) : Anil Kandregula It is certified that error appears in the above-identified patent and that said Letters Patent is hereby corrected as shown below:

In the Claims

Column 27, Line 8 (Claim 19): after "processor" add a ","

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*